United States Patent
Park et al.

(10) Patent No.: US 10,306,727 B2
(45) Date of Patent: May 28, 2019

(54) LIGHTING APPARATUS AND MOBILE TERMINAL FOR CONTROLLING THE SAME

(71) Applicant: LG ELECTRONICS INC., Seoul (KR)

(72) Inventors: Chilkeun Park, Seoul (KR); Sangmo Koo, Seoul (KR); Munheon Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/604,565

(22) Filed: May 24, 2017

(65) Prior Publication Data

US 2017/0359877 A1     Dec. 14, 2017

(30) Foreign Application Priority Data

Jun. 13, 2016 (KR) .................. 10-2016-0073166

(51) Int. Cl.
*H05B 33/08* (2006.01)
*F21V 8/00* (2006.01)
(Continued)

(52) U.S. Cl.
CPC ......... *H05B 33/0863* (2013.01); *G02B 6/005* (2013.01); *G02B 6/0023* (2013.01);
(Continued)

(58) Field of Classification Search
None
See application file for complete search history.

(56) References Cited

U.S. PATENT DOCUMENTS

2005/0259423 A1* 11/2005 Heuser .................. H01L 33/44
362/293
2014/0062309 A1   3/2014 Kim
(Continued)

FOREIGN PATENT DOCUMENTS

KR   1020130003870   1/2013
KR   1020150014268   2/2015

OTHER PUBLICATIONS

PCT International Application No. PCT/KR2017/004855, Notification of Transmittal of the International Search Report and the Written Opinion of the International Searching Authority, or Declaration dated Aug. 29, 2017, 16 pages.

*Primary Examiner* — Seokjin Kim
(74) *Attorney, Agent, or Firm* — Lee, Hong, Degerman, Kang & Waimey

(57) ABSTRACT

A lighting apparatus and a mobile terminal controlling the same are disclosed. The lighting apparatus comprises a light source module generating light; and an electrochromic module varying a wavelength of light incident from the light source module, wherein the electrochromic module absorbs light of a specific one among wavelength ranges of the light incident from the light source module, in accordance with a lighting mode which is input. The mobile terminal controlling a lighting apparatus, which includes a light source module and an electrochromic module, comprises an input module receiving a user input; a communication module transmitting a lighting control signal to the lighting apparatus; a display module displaying a setup window for setting a lighting mode of the lighting apparatus; and a controller controlling the input module, the communication module and the display module.

13 Claims, 25 Drawing Sheets

(51) Int. Cl.
*H05B 37/02* (2006.01)
*G02F 1/153* (2006.01)
*G02F 1/155* (2006.01)

(52) U.S. Cl.
CPC ......... *G02F 1/153* (2013.01); *H05B 33/0869* (2013.01); *H05B 37/0272* (2013.01); *G02F 1/155* (2013.01)

(56) References Cited

U.S. PATENT DOCUMENTS

| | | |
|---|---|---|
| 2014/0239852 A1 | 8/2014 | Kim et al. |
| 2015/0153625 A1* | 6/2015 | Chen ................. G02F 1/163 359/265 |
| 2015/0323728 A1 | 11/2015 | Lee et al. |
| 2017/0269283 A1* | 9/2017 | Wang ................. G02B 6/0016 |
| 2018/0074257 A1* | 3/2018 | McCollum ........... G02B 6/0075 |

* cited by examiner light light

LIGHTING APPARATUS AND MOBILE TERMINAL FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2016-0073166, filed on Jun. 13, 2016, the contents of which are all hereby incorporated by reference herein in its entirety.

BACKGROUND OF THE INVENTION

Field of the Invention

The present invention relates to a lighting apparatus and a mobile terminal for controlling the same.

Discussion of the Related Art

Generally, a bulb or a fluorescent light is used as an indoor or outdoor lamp. The bulb or the fluorescent light has problems in that it should be exchanged with a new one due to its short lifespan and its illuminance is gradually deteriorated due to degradation according to the lapse of used time.

Recently, lighting apparatuses, each of which uses a light emitting diode having long lifespan, low power consumption and high luminance as a light source, have been developed. The lighting apparatus which uses a light emitting diode (LED) as a light source may include a light source module, and a reflector for setting an emission beam angle of light emitted from the light source module. In this case, the light source module may include at least one LED light source provided on a circuit board. The reflector allows light emitted from the LED light source to be emitted at a certain beam angle through an opening by condensing the light, and may have a reflective surface on its inner surface.

However, the LED lighting apparatus of the related art, which emits single light or white light, has problems in that it is difficult to emit various lighting colors due to impossible color temperature control, not having a good color rendering index (CRI), and generating light of a blue area wavelength range harmful to a human body.

Therefore, the development of a lighting apparatus, which facilitates color temperature control, reduces light of a blue area wavelength range harmful to a human body and generates light close to natural light, will be required.

SUMMARY OF THE INVENTION

Accordingly, the present invention is directed to a lighting apparatus and a mobile terminal for controlling the same that substantially obviates one or more problems due to limitations and disadvantages of the related art.

An object of the present invention is to provide a lighting apparatus and a mobile terminal for controlling the same, in which an electrochromic module is positioned to provide a lighting mood convenient for a user in accordance with a lighting mode.

Another object of the present invention is to provide a lighting apparatus and a mobile terminal for controlling the same, in which an electrochromic module is positioned in the periphery of a light guide plate to improve lighting efficiency without thickness increase.

Still another object of the present invention is to provide a lighting apparatus and a mobile terminal for controlling the same, in which a light spectrum corresponding to a current illumination light is analyzed to accurately control a color temperature of light and a lighting color.

Further still another object of the present invention is to provide a lighting apparatus and a mobile terminal for controlling the same, in which lighting may be controlled using lighting information received from an external terminal.

Further still another object of the present invention is to provide a lighting apparatus and a mobile terminal for controlling the same, in which light spectrum information of a current illumination light is provided to an external terminal and lighting may be controlled in accordance with changed light spectrum information.

Further still another object of the present invention is to provide a lighting apparatus and a mobile terminal for controlling the same, in which a lighting mode setup window for controlling the lighting apparatus may be displayed.

Further still another object of the present invention is to provide a lighting apparatus and a mobile terminal for controlling the same, in which light spectrum information received from the lighting apparatus may be displayed and changed light spectrum information may be transmitted to the lighting apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a lighting apparatus according to one embodiment of the present invention comprises a light source module generating light; and an electrochromic module varying a wavelength of light incident from the light source module, wherein the electrochromic module absorbs light of a specific one among wavelength ranges of the light incident from the light source module, in accordance with a lighting mode which is input.

In another aspect of the present invention, a mobile terminal controlling a lighting apparatus, which includes a light source module and an electrochromic module, comprises an input module receiving a user input; a communication module transmitting a lighting control signal to the lighting apparatus; a display module displaying a setup window for setting a lighting mode of the lighting apparatus; and a controller controlling the input module, the communication module and the display module, wherein the controller performs communication connection with the lighting apparatus if the user input is a lighting mode setup of the lighting apparatus, displays a setup window for the lighting mode setup of the lighting apparatus connected for communication if the communication connection is performed, and transmits a lighting control signal corresponding to the set lighting mode to the corresponding lighting apparatus if the lighting mode of the lighting apparatus is set from the setup window.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but fail to have meanings or roles discriminated from each other. Also, in description of the embodiments disclosed in this specification, if detailed description of the disclosure known in respect of the present invention is determined to make the subject matter of the embodiments disclosed in this specification obscure, the detailed description will be omitted. Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present invention.

Although the terms such as "first" and/or "second" in this specification may be used to describe various elements, it is to be understood that the elements are not limited by such terms. The terms may be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" means that no third element exists there between.

It is to be understood that the singular expression used in this specification includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Figure 1:
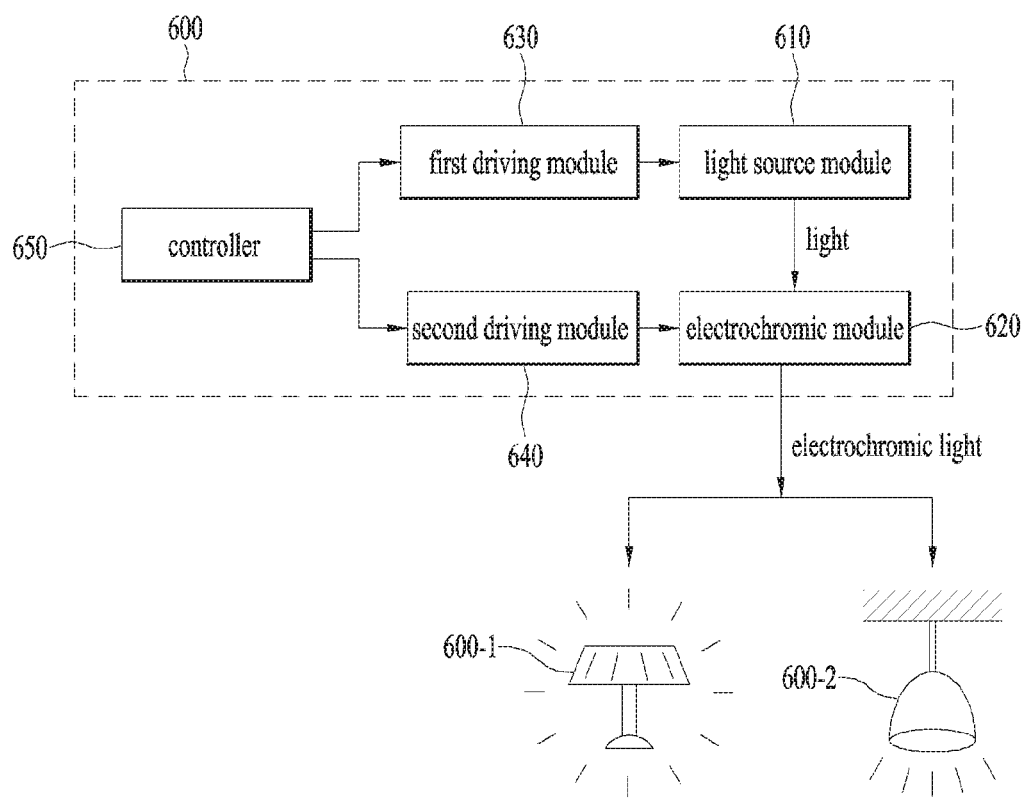
FIG. 1 is a block diagram illustrating a lighting apparatus according to the first embodiment of the present invention.

FIG. 1 is a block diagram illustrating a lighting apparatus according to the first embodiment of the present invention.

As shown in FIG. 1, a lighting apparatus 600 of the present invention may include a plurality of lightings such as a first lighting 600-1 and a second lighting 600-2. The lighting apparatus 600 may include a light source module 610, an electrochromic module 620, a first driving module 630, a second driving module 640, and a controller 650. Additionally, the lighting apparatus 600 of the present invention may further include a reflective plate, a light guide plate, an optical member, and a cover member.

In this case, the light source module 610 may be positioned at a side of the light guide plate, and may include a substrate having an electrode pattern and a light source arranged on the substrate.

The substrate of the light source module 610 may be any one of a single layered PCB (Printed Circuit Board), a multi-layered PCB, a metal PCB (MPCB), a metal core PCB (MCPCB), a flexible PCB (FPCB), and a ceramic PCB. The substrate may be formed of a material that efficiently reflects light and its surface may be formed of a color that efficiently reflects light, for example, a white color and silver color. Also, the substrate may be formed of any one of a reflective coating film and a reflective coating material layer, and may reflect light generated from the light source toward an optical member 500.

Subsequently, the light source of the light source module 610 may be positioned on the substrate. In this case, the light source may be a top view type light emitting diode. As the case may be, the light source may be a side view type light emitting diode. And, the light source may be a light emitting diode (LED) chip, which may be comprised of a blue LED chip or an ultraviolet LED chip, or may be comprised of at least one or a package type of combination of more than one from a red LED chip, a green LED chip, a blue LED chip, a yellow green LED chip, and a white LED chip.

Also, the light emitting diode chip may have a fluorescent body. In this case, the fluorescent body may be any one or more of a Ganet based (YAG, TAG) fluorescent body, a Silicate based fluorescent body, a Nitride based fluorescent body, and an Oxynitride based fluorescent body. Subsequently, the fluorescent body may be any one of a yellow florescent body, a green florescent body and a red fluorescent body. A white LED may be realized by combining a yellow phosphor on a blue LED or simultaneously using a red phosphor and a green phosphor on a blue LED, and may be realized by simultaneously using a yellow phosphor, a red phosphor and a green phosphor on a blue LED.

Also, the light source of the light source module 610 may be provided in such a manner that an LED package may be bonded on the substrate or an LED chip which is not packaged may directly be bonded on the substrate.

The substrate of the light source module 610 may directly be in contact with a radiant member. As the case may be, a radiant pad may be positioned between the substrate of the light source module 610 and the radiant member.

Then, the electrochromic module 620 may vary a wavelength of light incident from the light source module 610. In this case, the electrochromic module 620 may absorb light of a specific one among wavelength ranges of light incident from the light source module 610 in accordance with a lighting mode which is inputted.

The electrochromic module 620 may be positioned between the reflective plate and the light guide plate.

As the case may be, the electrochromic module 620 may be positioned between the light guide plate and the optical member.

As another case, the electrochromic module 620 may be positioned between the optical member and the cover member.

As still another case, the electrochromic module 620 may be positioned between the light source module 610 and the light guide plate. In this case, the electrochromic module 620 may be positioned directly in contact with the light source module 610, and may be positioned to be spaced apart from a side of the light guide plate at a certain interval. Also, the electrochromic module 620 may be positioned to be spaced apart from the light source module 610 at a certain interval or may directly be in contact with the side of the light guide plate. Also, one side of the electrochromic module 620 may directly be in contact with the light source module 610, and the other side of the electrochromic module 620 may directly be in contact with the side of the light guide plate.

For example, the electrochromic module 620 may include a first transparent electrode, a second transparent electrode, and an electrochromic layer arranged between the first transparent electrode and the second transparent electrode. In this case, the electrochromic layer may absorb a specific wavelength range of light incident from the light source module 610 in accordance with voltages applied to the first and second transparent electrodes.

The electrochromic layer may be any one of a multi-layered thin film state, a solution state, a mixture state of the multi-layered thin film and the solution. As the case may be, the electrochromic layer may be formed in such a manner that an electrolytic layer and an electrochromic material layer are deposited, or may be formed of a mixture layer of electrolyte and an electrochromic material. As another case, the electrochromic layer may be a mixture of an electrochromic material and nano particles. In this case, the nano particles may be made of at least one or more selected from a group of a titanium oxide, a zirconium oxide, a strontium oxide, a niobium oxide, a hafnium oxide, an indium oxide, a tin oxide, and a zinc oxide. The nano particles may have a size of 5 nm to 30 nm, approximately.

Also, a specific wavelength range of light absorbed by the electrochromic layer may be varied depending on a mixture ratio of the electrochromic material and nano particles, a size of nano particles, or a voltage value which is applied.

As another example, a moisture absorption layer may be positioned between the first transparent electrode and the electrochromic layer of the electrochromic module 620 or between the electrochromic layer and the second transparent electrode of the electrochromic module 620. Since the electrochromic layer is vulnerable to water or moisture, the moisture absorption layer is arranged to block externally permeated water or moisture.

Also, the electrochromic module 620 may control a light absorption ratio in accordance with a lighting mode, which is input, when absorbing light of a specific wavelength range, and the light source module 610 may control a light color and light luminance in accordance with a lighting mode which is input.

The light source module 610 and the electrochromic module 620 may be driven at the same time zone if the lighting mode is input.

As the case may be, the light source module 610 and the electrochromic module 620 may be driven at their respective time zones different from each other if the lighting mode is input.

Meanwhile, the reflective plate may include at least one of metal and metal oxide, and may include metal or metal oxide, which has high reflectivity such as Al, Ag, Au or $TiO_2$. The reflective plate may have a thickness of 100 um to 300 um, approximately, and may be surface-treated with bead to improve a reflective diffusion function.

The light guide plate may be positioned on the reflective plate. For example, the light guide plate may be any one of, but not limited to, acrylic resin such as PMMA (Polymethylmethacrylate), PET (polyethylene terephthlate), COC (Cyclic Olefin Copolymers), PEN (polyethylene naphthalate), PC (Polycarbonate), PS (Polystyrene), and MS (Mathacylate styrene) resin.

Subsequently, the optical member may be positioned on the light guide plate. The optical member is to diffuse light emitted through the light guide plate, and an embossed pattern may be formed on an upper surface of the optical member to increase a diffusion effect. Also, the optical member may be formed of several layers, and the embossed pattern may be formed on the uppermost layer or a surface of any one of the several layers. In this case, the embossed pattern may have a stripe pattern position or arranged along the light source module 610. At this time, the embossed pattern has a protrusion on the surface of the optical member, wherein the protrusion includes first and second surfaces facing each other, and an angle between the first and second surfaces may be an obtuse angle or an acute angle.

As the case may be, the optical member is comprised of at least one sheet, and may selectively include a diffusion sheet, a prism sheet, or a luminance enhancement sheet. In this case, the diffusion sheet diffuses light emitted from the light source, the prism sheet guides the diffused light to an emission area, and the luminance enhancement sheet enhances luminance.

As another case, the optical member may be coated with a milk-white paint. The milk-white paint may include a diffusing agent that may diffuse light passed through the optical member.

As still another case, the optical member may include an inner surface toward an inner side of the lighting apparatus 600 and an outer surface toward an outer side of the lighting apparatus 600. Roughness of the inner surface of the optical member may be greater than that of the outer surface of the optical member. This is because that scattering and diffusion of light emitted from the light source module 610 may be increased if roughness of the inner surface of the optical member is greater than that of the outer surface of the optical member.

As further still another case, the optical member may include a fluorescent body to excite light emitted from the light source module 610. In this case, the fluorescent body may include at least one or more of a Ganet based (YAG, TAG) fluorescent body, a Silicate based fluorescent body, a Nitride based fluorescent body, and an Oxynitride based fluorescent body.

Next, the cover member may be positioned on the optical member. In this case, the cover member may be any one selected from PC (Polycarbonate), PET (polyethylene terephthlate), and ACM (Advanced composite materials). A cover member of which flame-retardant grade is about V0 or more may be used as the cover member. For example, a cover member of which flame-retardant grade is V2 or more may be used. This is because that the cover member may protect the electrochromic module 620 located inside the cover member by blocking external heat. The cover member may be surface-treated to block a fingerprint or scratch.

Meanwhile, the first driving module 630 may drive the light source module 610 in accordance with a first control signal of the controller 650, and the second driving module 640 may drive the electrochromic module 620 in accordance with a second control signal of the controller 650.

The controller 650 may control the first and second driving modules 630 and 640. The controller 650 may control the first driving module 630 to generate light corresponding to the lighting mode to which the light source module 610 is input if the lighting mode is input. Then, if light corresponding to the lighting mode input from the light source module 610 is generated, the controller 650 may control the second driving module 640 to analyze a light spectrum corresponding to the generated light and absorb light of a specific wavelength range corresponding to the lighting mode to which the electrochromic module 620 is input, on the basis of the analyzed light spectrum. In this case, the light spectrum may previously be set and stored in a memory. Therefore, the controller 650 may determine a specific wavelength range of light desired to be absorbed by analyzing light spectrum information corresponding to the lighting mode.

The controller 650 may control the second driving module 640 to adjust a light absorption ratio in accordance with the lighting mode which is inputted, when absorbing the light of the specific wavelength range. In this case, the controller 650 may control the second driving module 640 to adjust a voltage value applied to the electrochromic module 620 in accordance with a light absorption ratio desired to be adjusted when adjusting the light absorption ratio. If the light absorption ratio is adjusted by the electrochromic module 620, light intensity corresponding to the specific wavelength range may be adjusted.

Also, if the lighting mode is inputted, the controller 650 may control the first driving module 630 to determine a light color and light luminance corresponding to the input lighting mode and generate light in accordance with the determined light color and light luminance.

Then, the controller 650 may simultaneously control the first driving module 630 and the second driving module 640 if the lighting mode is input.

As another case, the controller 650 may control the first driving module 630 and the second driving module 640 at different time zones if the lighting mode is inputted. For example, the controller 650 may first control the first driving module 630 and then control the second driving module 640.

As still another case, if the lighting mode is input, the controller 650 may control the second driving module 640 only.

As described above, according to the first embodiment of the present invention, the light source module and the electrochromic module may be arranged to provide a lighting mood convenient for a user in accordance with a lighting mode, facilitate color temperature control, reduce light of a blue area wavelength range harmful to a human body and generate light close to natural light.

Also, according to the first embodiment of the present invention, the electrochromic module may be positioned in the periphery of the light guide plate to improve lighting efficiency without thickness increase.

Also, according to the first embodiment of the present invention, the light spectrum corresponding to the lighting mode may be analyzed to accurately control a color temperature of the light and a lighting color.

Figure 2:
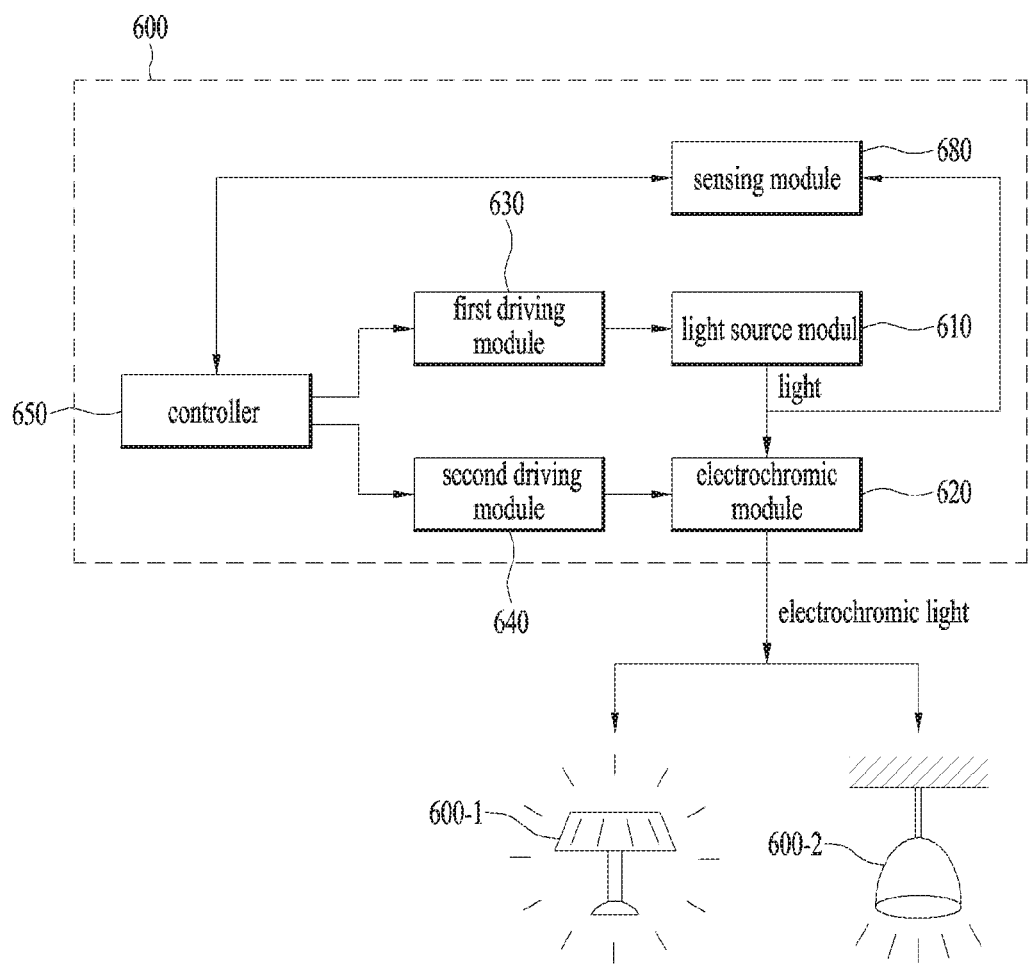
FIG. 2 is a block diagram illustrating a lighting apparatus according to the second embodiment of the present invention.

FIG. 2 is a block diagram illustrating a lighting apparatus according to the second embodiment of the present invention.

As shown in FIG. 2, a lighting apparatus 600 of the present invention may include a plurality of lightings such as a first lighting 600-1 and a second lighting 600-2. The lighting apparatus 600 may include a light source module 610, an electrochromic module 620, a first driving module 630, a second driving module 640, a controller 650, and a sensing module 680. Additionally, the lighting apparatus 600 of the present invention may further include a reflective plate, a light guide plate, an optical member, and a cover member.

In the second embodiment of the present invention, the sensing module 680 is further provided in the first embodiment of the present invention. Repeated description of the first embodiment of the present invention will be omitted.

The sensing module 680 may sense light generated from the light source module 610.

The controller 650 may control the first driving module 630 to generate light corresponding to the lighting mode to which the light source module 610 is input if the lighting mode is input. If light corresponding to the input lighting mode is generated, the controller 650 may control the sensing module 680 to sense the light generated from the light source module 610, and may control second driving module 640 to analyze a spectrum of the light sensed by the sensing module 680 and absorb light of a specific wavelength range corresponding to the lighting mode to which the electrochromic module 620 is input, on the basis of the analyzed light spectrum. In this case, the controller 650 may sense the currently generated illumination light in real time through the sensing module 680 and analyze light spectrum information corresponding to the sensed illumination light in real time. Therefore, since the controller 650 may determine a specific wavelength of light desired to be absorbed, on the basis of the light spectrum information of which reliability is improved, the controller 650 may accurately control a color temperature of light and a lighting color.

Also, the controller 650 may control the second driving module 640 to adjust a light absorption ratio in accordance with the lighting mode which is input, when absorbing the light of the specific wavelength range. In this case, the controller 650 may control the second driving module 640 to adjust a voltage value applied to the electrochromic module 620 in accordance with a light absorption ratio desired to be adjusted when adjusting the light absorption ratio. If the light absorption ratio is adjusted by the electrochromic module 620, light intensity corresponding to the specific wavelength range may be adjusted.

Also, if the lighting mode is input, the controller 650 may control the first driving module 630 to determine a light color and light luminance corresponding to the input lighting mode and generate light in accordance with the determined light color and light luminance.

Then, the controller 650 may simultaneously control the first driving module 630 and the second driving module 640 if the lighting mode is input.

As another case, the controller 650 may control the first driving module 630 and the second driving module 640 at different time zones if the lighting mode is input. For example, the controller 650 may first control the first driving module 630 and then control the second driving module 640.

As still another case, if the lighting mode is input, the controller 650 may control the second driving module 640 only.

As described above, according to the second embodiment of the present invention, the current illumination light may be sensed in real time through the sensing module to analyze the light spectrum corresponding to the sensed illumination light in real time, whereby the color temperature of the light and the lighting color may accurately be controlled based on the light spectrum information of high reliability.

Figure 3:
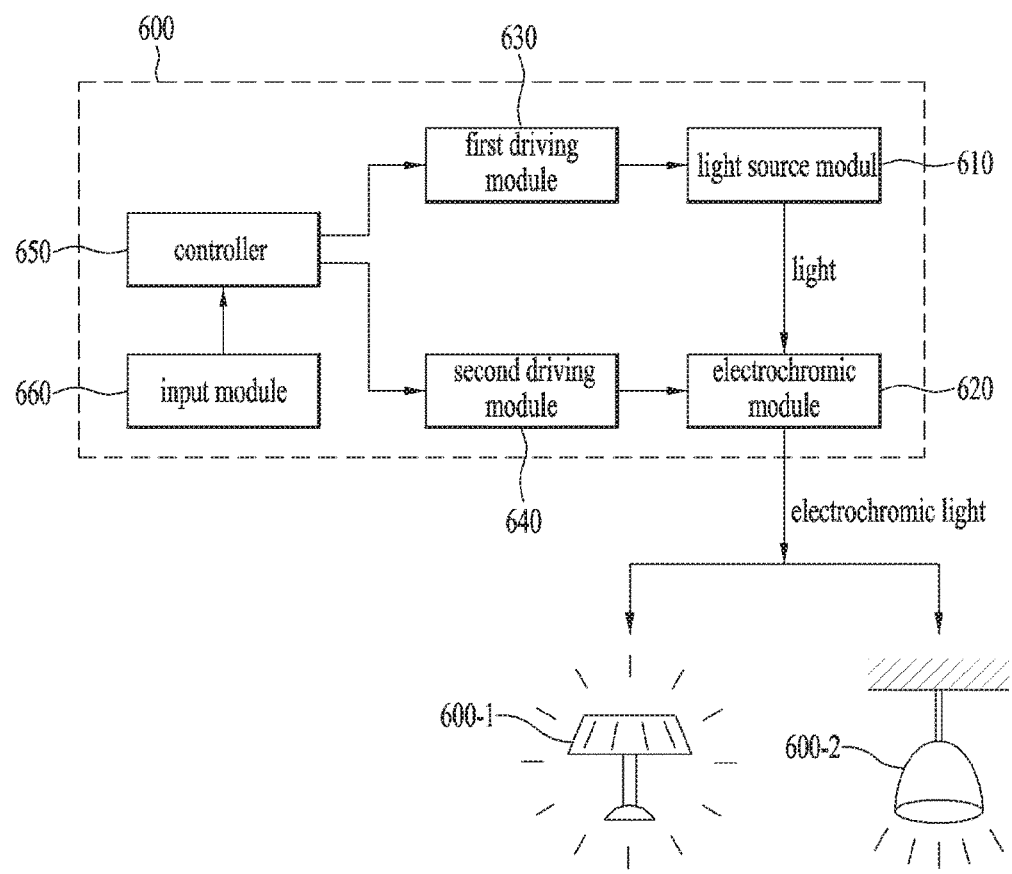
FIG. 3 is a block diagram illustrating a lighting apparatus according to the third embodiment of the present invention.

FIG. 3 is a block diagram illustrating a lighting apparatus according to the third embodiment of the present invention.

As shown in FIG. 3, a lighting apparatus 600 of the present invention may include a plurality of lightings such as a first lighting 600-1 and a second lighting 600-2. The lighting apparatus 600 may include a light source module 610, an electrochromic module 620, a first driving module 630, a second driving module 640, a controller 650, and an input module 660. Also, the sensing module 680 of the second embodiment may further be provided. Additionally, the lighting apparatus 600 of the present invention may further include a reflective plate, a light guide plate, an optical member, and a cover member.

In the third embodiment of the present invention, the input module 660 is further provided in the first embodiment of the present invention. Repeated description of the first embodiment of the present invention will be omitted.

The input module 660 may include a plurality of lighting mode input buttons.

If any one of the lighting mode input buttons of the input module 660 is selected, the controller 650 may control the first and second driving modules 630 and 640 to generate light through the light source module 610 in accordance with a lighting mode corresponding to the selected lighting mode input button and absorb a specific wavelength range of light generated by the electrochromic module 620.

According to the third embodiment of the present invention, the input module, which includes a plurality of lighting mode input buttons, may be arranged to provide user convenience to allow a user to select a desired lighting mode. The user may control the plurality of lightings easily and conveniently through the input module of the lighting apparatus, and may easily and conveniently input respective lighting modes different from each other per lighting.

Figure 4:
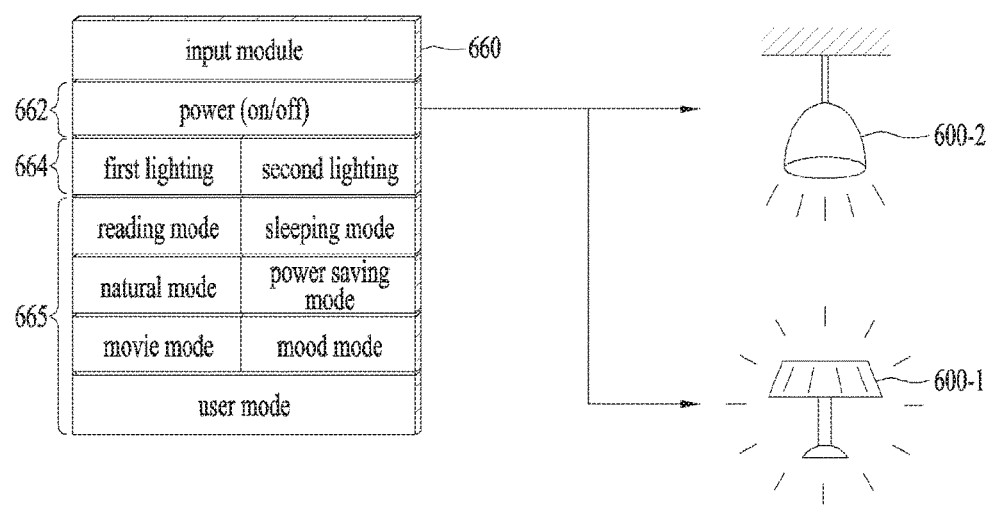
FIG. 4 is a diagram illustrating an input module of FIG. 3.

FIG. 4 is a detailed diagram illustrating the input module of FIG. 3.

As shown in FIG. 4, the input module 660 of the lighting apparatus may include a plurality of lighting mode input buttons. For example, the input module 660 may include a power button 662 for turning on/off a power of a lighting, a lighting selection button 664 selecting a lighting desired to be controlled from a plurality of lightings including a first lighting and a second lighting, and a lighting mode selection button 665 including a reading mode, a sleeping mode, a natural mode, a power saving mode, a movie mode, a mood mode, and a user mode.

If a user input for selecting the first lighting from the lighting selection button of the input module 660 is received and a user input for selecting the reading mode from the lighting mode selection button 665 of the input module 660, the controller identifies a power state of the first lighting 600-1. If the power of the first lighting 600-1 is a power-on state, the controller controls the light source module of the first lighting 600-1 to generate light having a light color and light luminance corresponding to the reading mode, and controls the electrochromic module of the first lighting 600-1 to absorb light of a specific wavelength range corresponding to the reading mode. That is, the controller may control the first lighting 600-1 to emit electrochromic light which has reduced a blue wavelength range harmful to a human body at a color temperature of about 6000K, thereby reducing eye fatigue when a user reads a book.

Figure 5:
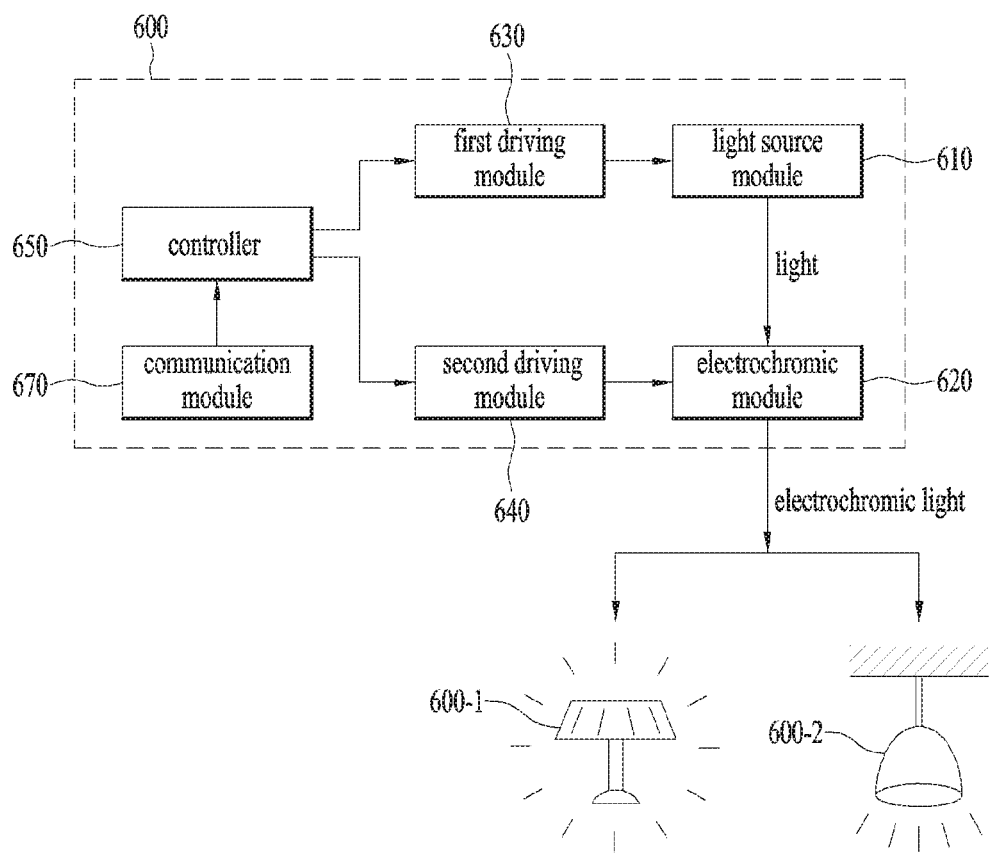
FIG. 5 is a block diagram illustrating a lighting apparatus according to the fourth embodiment of the present invention.

FIG. 5 is a block diagram illustrating a lighting apparatus according to the fourth embodiment of the present invention.

As shown in FIG. 5, a lighting apparatus 600 of the present invention may include a plurality of lightings such as a first lighting 600-1 and a second lighting 600-2. The lighting apparatus 600 may include a light source module 610, an electrochromic module 620, a first driving module 630, a second driving module 640, a controller 650, and a communication module 670. Also, the sensing module 680 of the second embodiment may further be provided, and the input module 660 of the third embodiment may further be provided. Additionally, the lighting apparatus 600 of the present invention may further include a reflective plate, a light guide plate, an optical member, and a cover member.

In the fourth embodiment of the present invention, the communication module 670 is further provided in the first embodiment of the present invention. Repeated description of the first embodiment of the present invention will be omitted.

The communication module 670 may receive a lighting control signal from an external terminal.

If the lighting control signal received from the external terminal requests a specific lighting mode, the controller 650 may control the first and second driving modules 630 and 640 to generate light through the light source module 610 in accordance with the requested specific lighting mode and absorb a specific wavelength range of light generated by the electrochromic module 620.

Also, if specific lighting information corresponding to the requested specific lighting mode is included in the lighting control signal received from the external terminal, the controller 650 may control the first and second driving modules 630 and 640 in accordance with the specific lighting information. In this case, the specific lighting information may include at least any one of a light color corresponding to the requested specific lighting mode, light luminance, a specific wavelength range of light desired to be absorbed, and a light absorption ratio of the specific wavelength range.

If the specific lighting information corresponding to the requested specific lighting mode is not included in the lighting control signal received from the external terminal, the controller 650 may control the first and second driving modules 630 and 640 in accordance with previously set lighting information. In this case, the previously set lighting information may include at least any one of a light color corresponding to the requested specific lighting mode, light luminance, a specific wavelength range of light desired to be absorbed, and a light absorption ratio of the specific wavelength range.

Also, if the lighting control signal received from the external terminal requests a user lighting mode, the controller 650 may analyze a light spectrum corresponding to the generated light and transmit the analyzed light spectrum information to the external terminal. In this case, the light spectrum information may include light wavelength and light intensity information of a current lighting, and harmful light wavelength and light intensity information of the current lighting.

If light spectrum change information is received from the external terminal which has transmitted the light spectrum information, the controller 650 may control the first and second driving modules 630 and 640 to change the light spectrum of the current lighting in accordance with the received light spectrum change information, generate light through the light source module 610 in accordance with the changed light spectrum and absorb a specific wavelength range of light generated by the electrochromic module 620.

As described above, according to the fourth embodiment of the present invention, lighting may be controlled using the lighting information received from the external terminal, whereby the lighting apparatus of low cost may be manufactured and user convenience may be provided.

Also, according to the fourth embodiment of the present invention, the light spectrum information of the current illumination light may be provided to the external terminal, and lighting may be controlled in accordance with the changed light spectrum information, whereby various lighting moods may be provided in accordance with sensibility of a user.

Figure 6:
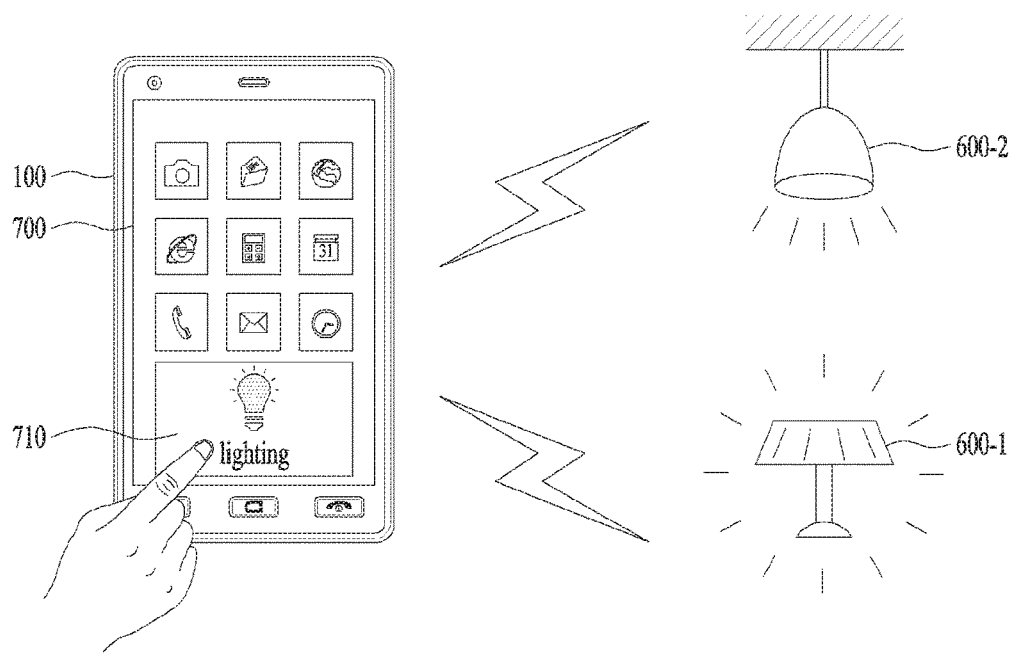
FIG. 6 is a diagram illustrating a mobile terminal for controlling the lighting apparatus of FIG. 5.
Figure 7:
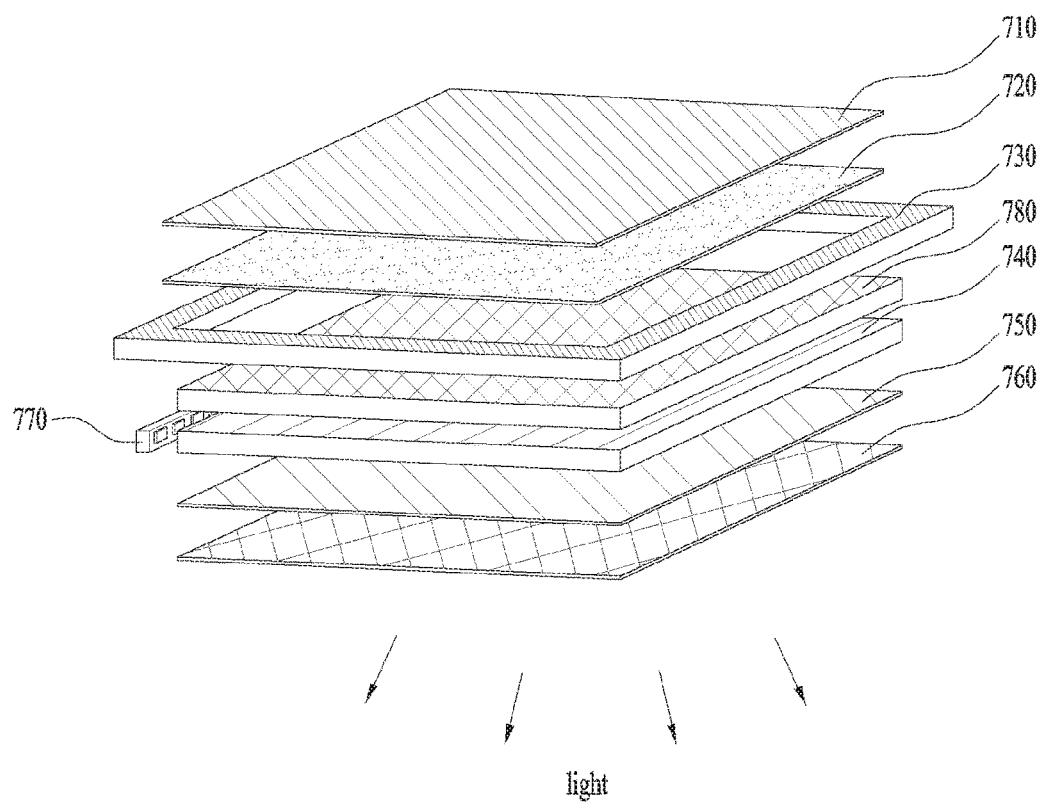
FIGS. 7 to 10 are diagrams illustrating structures of a lighting apparatus according to the present invention.

FIG. 6 is a diagram illustrating a mobile terminal for controlling the lighting apparatus of FIG. 5.

As shown in FIG. 6, the mobile terminal 100 may be connected with a plurality of lightings such as a first lighting 600-1 and a second lighting 600-2 through communication and control the lightings.

The mobile terminal 100 may display a lighting icon 710 for controlling the lighting apparatus on a display screen 700. If a user input for selecting the lighting icon 710 is received, the mobile terminal 100 may perform communication connection with the plurality of lightings including the first lighting 600-1 and the second lighting 600-2. Then, the mobile terminal 100 may transmit a lighting control signal to the first lighting 600-1 and the second lighting 600-2 connected therewith through communication.

For example, if the lighting control signal received from the mobile terminal 100 requests a specific lighting mode, the lighting apparatus may control the light source module and the electrochromic module in accordance with the requested specific lighting mode.

Also, if specific lighting information corresponding to the requested specific lighting mode is included in the lighting control signal received from the mobile terminal 100, the lighting apparatus may control the light source module and the electrochromic module in accordance with the specific lighting information. In this case, the specific lighting information may include at least any one of a light color corresponding to the requested specific lighting mode, light luminance, a specific wavelength range of light desired to be absorbed, and a light absorption ratio of the specific wavelength range.

If the specific lighting information corresponding to the requested specific lighting mode is not included in the lighting control signal received from the mobile terminal 100, the lighting apparatus may control the light source module and the electrochromic module in accordance with previously set lighting information. In this case, the previously set lighting information may include at least any one of a light color corresponding to the requested specific lighting mode, light luminance, a specific wavelength range of light desired to be absorbed, and a light absorption ratio of the specific wavelength range.

Also, if the lighting control signal received from the mobile terminal 100 requests a user lighting mode, the lighting apparatus may analyze a light spectrum corresponding to the generated light and transmit the analyzed light spectrum information to the mobile terminal 100. In this case, the light spectrum information may include light wavelength and light intensity information of a current lighting, and harmful light wavelength and light intensity information of the current lighting.

If light spectrum change information is received from the mobile terminal 100 which has transmitted the light spectrum information, the lighting apparatus may change the light spectrum of the current lighting in accordance with the received light spectrum change information and control the light source module and the electrochromic module in accordance with the changed light spectrum.

FIGS. 7 to 10 are diagrams illustrating structures of a lighting apparatus according to the present invention.

As shown in FIGS. 7 to 10, the lighting apparatus of the present invention may include a first cover member 710, a reflective plate 720, a frame 730, a light guide plate 740, an optical member 750, a second cover member 760, a light source module 770, and an electrochromic module 780.

In this case, the light source module 770 may be positioned at a side of the light guide plate, and may include a substrate having an electrode pattern, and a light source arranged on the substrate.

The light source of the light source module 770 may be a top view type light emitting diode. As the case may be, the light source may be a side view type light emitting diode. And, the light source may be a light emitting diode (LED) chip, which may be comprised of a blue LED chip or an ultraviolet LED chip, or may be comprised of at least one or a package type of combination of more than one from a red LED chip, a green LED chip, a blue LED chip, a yellow green LED chip, and a white LED chip.

Also, the light emitting diode chip may have a fluorescent body. In this case, the fluorescent body may be any one or more of a Ganet based (YAG, TAG) fluorescent body, a Silicate based fluorescent body, a Nitride based fluorescent body, and an Oxynitride based fluorescent body. Subsequently, the fluorescent body may be any one of a yellow florescent body, a green florescent body and a red fluorescent body. A white LED may be realized by combining a yellow phosphor on a blue LED or simultaneously using a red phosphor and a green phosphor on a blue LED, and may be realized by simultaneously using a yellow phosphor, a red phosphor and a green phosphor on a blue LED.

Also, the light source of the light source module 770 may be provided in such a manner that an LED package may be bonded on the substrate or an LED chip which is not packaged may directly be bonded on the substrate.

Meanwhile, the reflective plate 720 may include at least one of metal and metal oxide, and may include metal or metal oxide, which has high reflectivity such as Al, Ag, Au or $TiO_2$.

The light guide plate 740 may be positioned on the reflective plate. For example, the light guide plate 740 may be any one of, but not limited to, acrylic resin such as PMMA (Polymethylmethacrylate), PET (polyethylene terephthlate), COC (Cyclic Olefin Copolymers), PEN (polyethylene naphthalate), PC (Polycarbonate), PS (Polystyrene), and MS (Mathacylate styrene) resin.

Subsequently, the optical member 750 may be positioned on the light guide plate. The optical member 750 is comprised of at least one sheet, and may selectively include a diffusion sheet, a prism sheet, or a luminance enhancement sheet. In this case, the diffusion sheet diffuses light emitted from the light source, the prism sheet guides the diffused light to an emission area, and the luminance enhancement sheet enhances luminance.

Then, each of the first and second cover members 710 and 760 may be any one selected from PC (Polycarbonate), PET (polyethylene terephthlate), and ACM (Advanced composite materials). A cover member of which flame-retardant grade is about V0 or more may be used as each of the first and second cover members. For example, a cover member of which flame-retardant grade is V2 or more may be used. This is because that the cover member may protect the electrochromic module 780 located inside the cover member by blocking external heat. The first and second cover members may be surface-treated to block a fingerprint or scratch.

The electrochromic module 780 may vary a wavelength of light incident from the light source module 770. In this case, the electrochromic module 780 may absorb light of a specific one among wavelength ranges of light incident from the light source module 770 in accordance with a lighting mode which is inputted. In this case, the electrochromic module 780 may be positioned at various positions from the respective elements of the lighting apparatus.

For example, the electrochromic module 780 may be positioned between the reflective plate 720 and the light guide plate 740.

Figure 8:
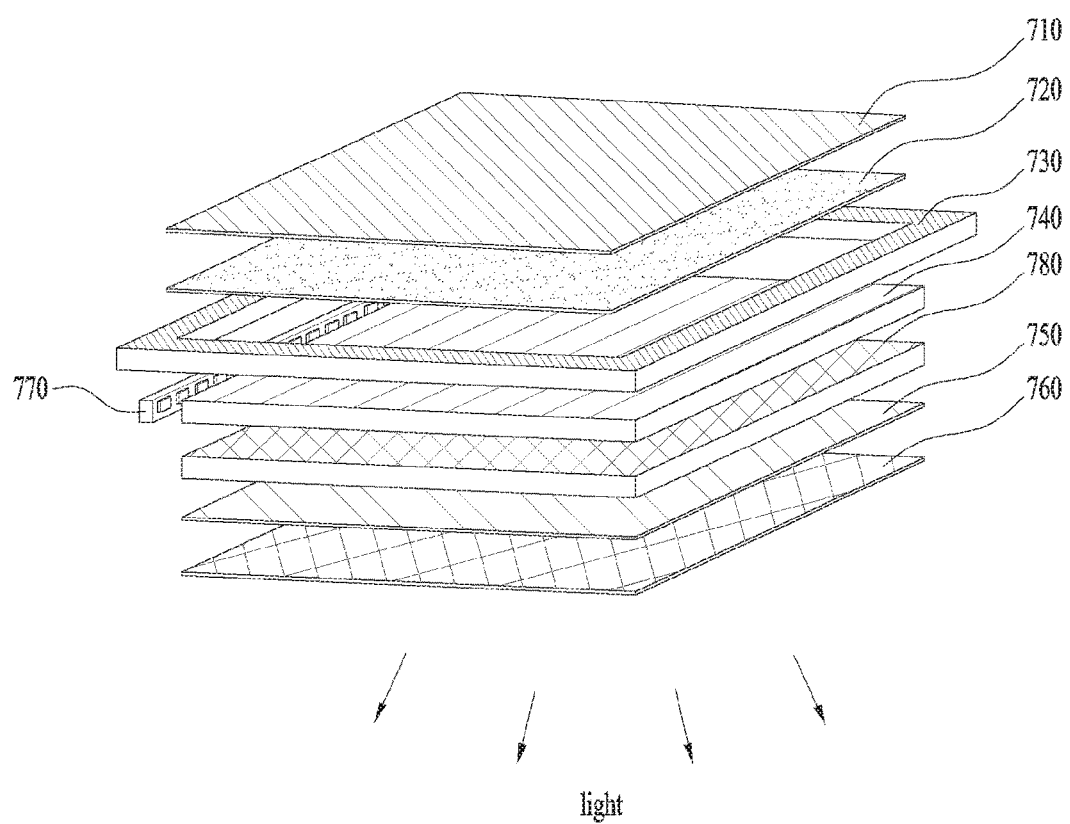

As the case may be, as shown in FIG. 8, the electrochromic module 780 may be positioned between the light guide plate 740 and the optical member 750.

Figure 9:
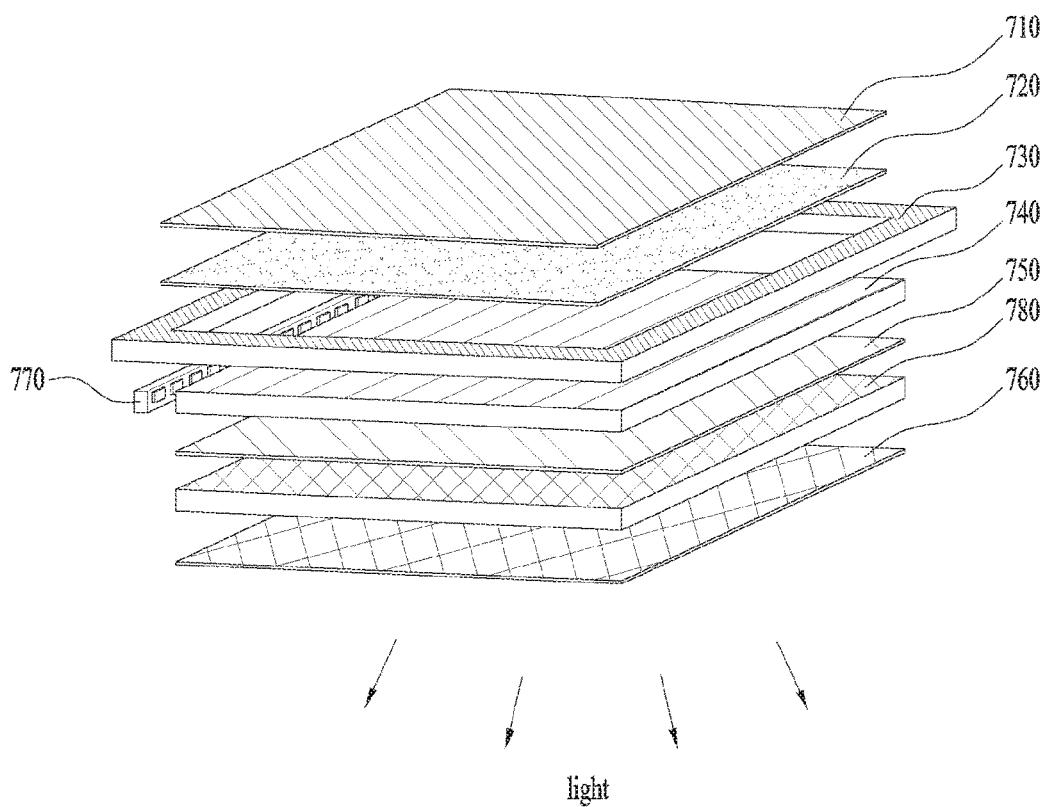

As another case, as shown in FIG. 9, the electrochromic module 780 may be positioned between the optical member 750 and the second cover member 760.

Figure 10:
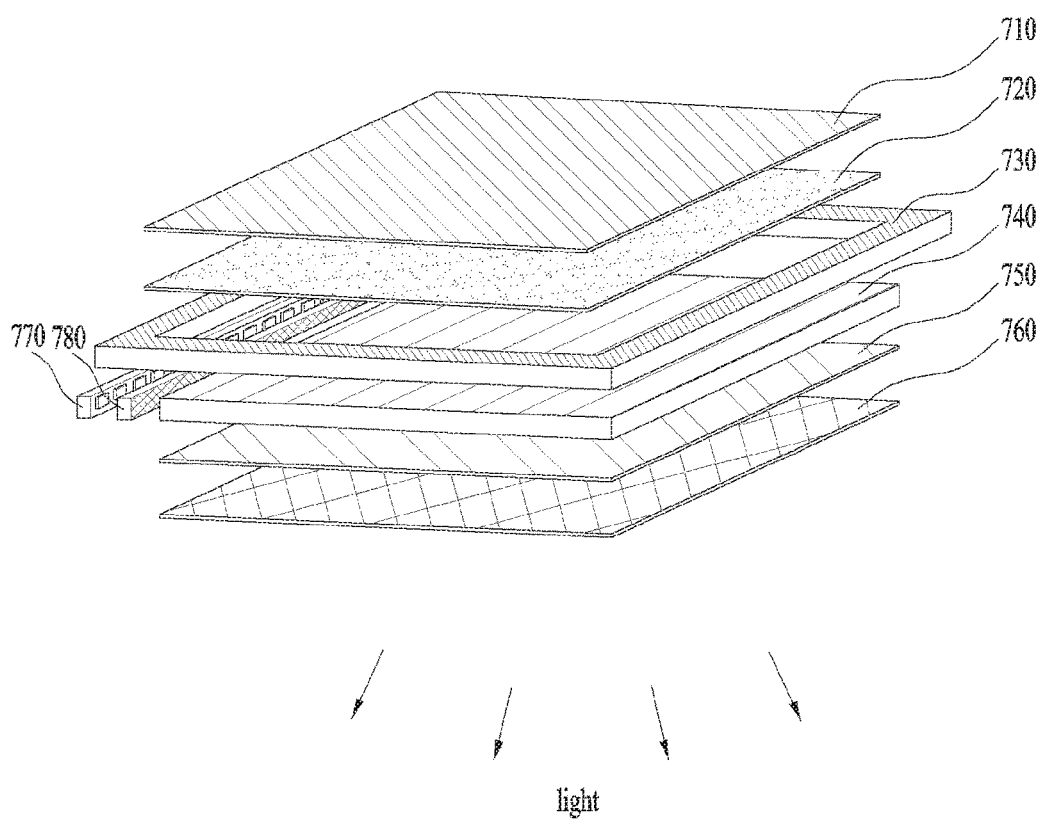

As still another case, as shown in FIG. 10, the electrochromic module 780 may be positioned between the light source module 770 and the side of the light guide plate 740. If the electrochromic module 780 is positioned between the light source module 770 and the side of the light guide plate 740, it is advantageous that an overall thickness of the lighting apparatus may be reduced.

As described above, according to the present invention, the electrochromic module may be positioned in the periphery of the light guide plate, whereby lighting efficiency may be increased without thickness increase.

FIGS. 11 to 14 are diagrams illustrating an electrochromic module arranged between a light source module and a light guide plate.

As shown in FIGS. 11 to 14, the electrochromic module 780 may be positioned between the light source module 770 and the side of the light guide plate 740. If the electrochromic module 780 is positioned between the light source module 770 and the side of the light guide plate 740, it is advantageous that an overall thickness of the lighting apparatus may be reduced.

Figure 11:
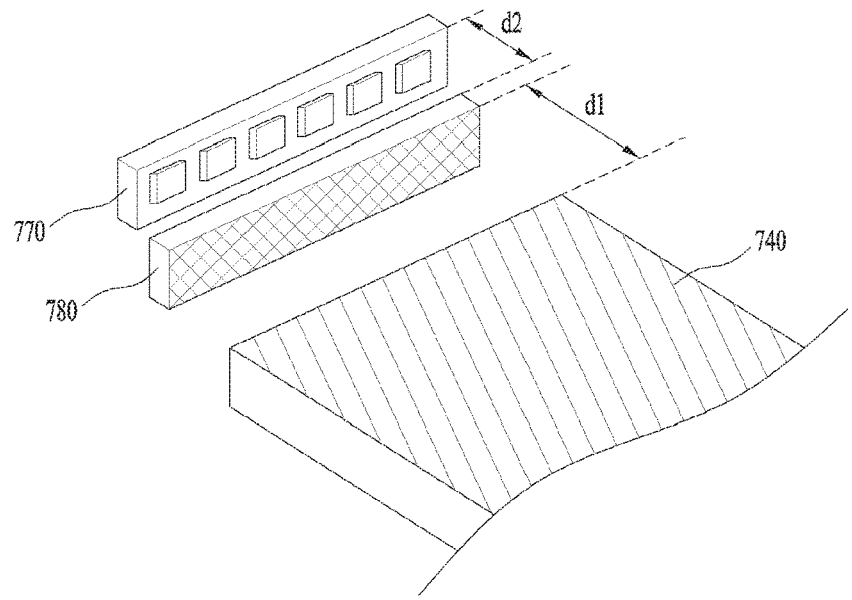
FIGS. 11 to 14 are diagrams illustrating an electrochromic module positioned between a light source module and a light guide plate.

As shown in FIG. 11, the electrochromic module 780 may be positioned at a second distance d2 from the light source module 770, and may be arranged at a first distance d1 from the side of the light guide plate 740. In the arrangement structure of FIG. 11, a circuit arrangement structure for electrical connection between the electrochromic module 780 and the driving module is provided, whereby circuit arrangement may be convenient.

Figure 12:
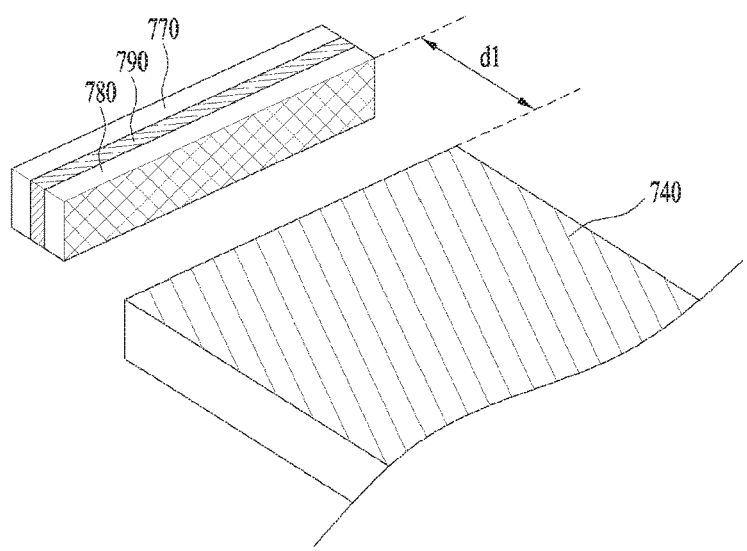

As the case may be, as shown in FIG. 12, the electrochromic module 780 may directly be in contact with the light source module 770, and may be positioned at a first distance d1 from the side of the light guide plate 740. The electrochromic module 780 may be attached to the light source module 770 by an adhesive 790. In the arrangement structure of FIG. 12, the electrochromic module 780 and the light source module 770 may be manufactured in a single body, whereby it is economical and assembly may be performed simply.

Figure 13:
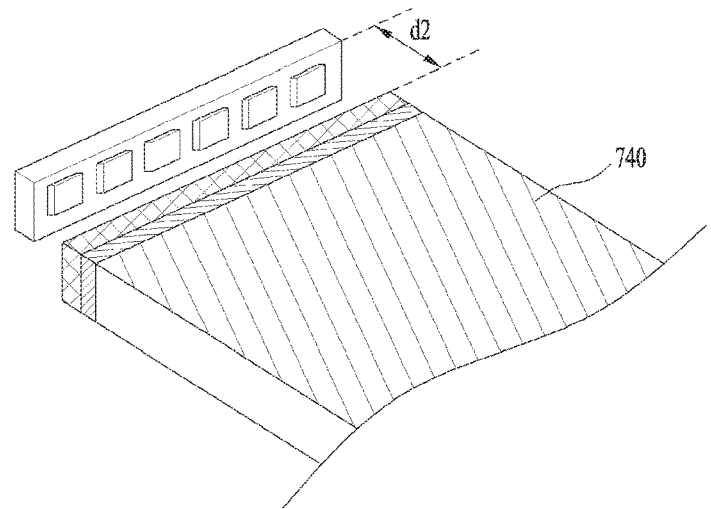

As another case, as shown in FIG. 13, the electrochromic module 780 may be positioned at a second distance d2 from the light source module 770, and may directly be in contact with the side of the light guide plate 740. The electrochromic module 780 may be attached to the side of the light guide plate 740 by the adhesive 790. In the arrangement structure of FIG. 13, since the electrochromic module 780 is attached to the side of the light guide plate 740, loss does not occur in electrochromic light, whereby light efficiency may be improved.

Figure 14:
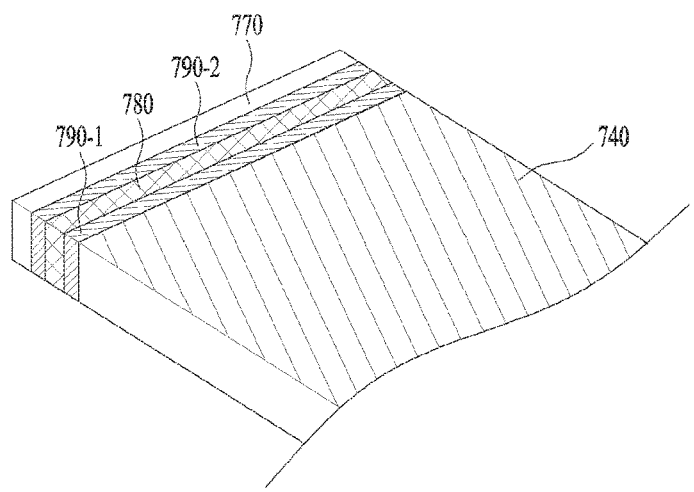

As still another case, as shown in FIG. 14, one side of the electrochromic module 780 may directly be in contact with the light source module 770, and the other side of the electrochromic module 780 may directly be in contact with the side of the light guide plate 740. The electrochromic module 780 may be attached to the light source module 770 by a second adhesive 790-2, and may be attached to the side of the light guide plate 740 by a first adhesive 790-1. In the arrangement structure of FIG. 14, since the electrochromic module 780 is attached to each of the light source module 770 and the side of the light guide plate 740, light loss occurs rarely, whereby optimized light efficiency may be obtained. In this case, if a reflective film is additionally attached to outer sides of the first and second adhesives 790-1 and 790-2, light loss that may occur in the first and second adhesives 790-1 and 790-2 may be avoided, and light may be reflected inwardly, whereby light efficiency may be more improved.

Figure 15:
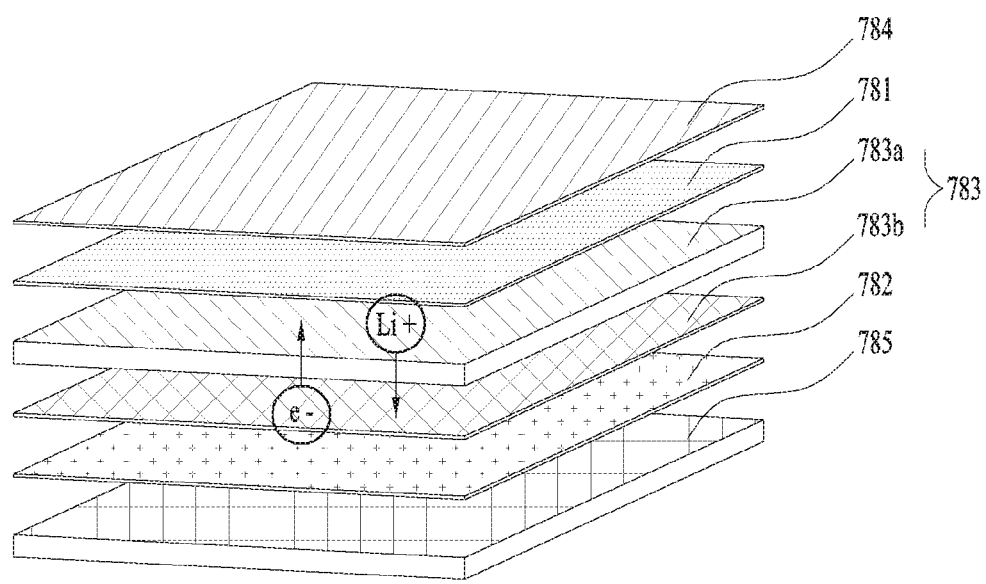
FIGS. 15 and 16 are diagrams illustrating an electrochromic module according to the present invention.
Figure 16:
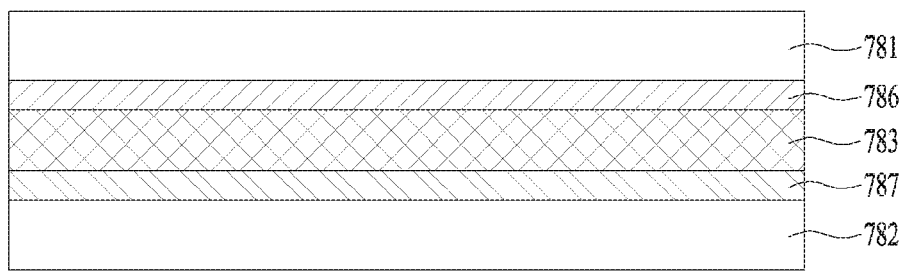

FIGS. 15 and 16 are diagrams illustrating an electrochromic module according to the present invention.

As shown in FIGS. 15 and 16, the electrochromic module may absorb light of a specific one among wavelength ranges of light incident from the light source module in accordance with a lighting mode which is input.

The electrochromic module may include a first transparent electrode 781, a second transparent electrode 782, and an electrochromic layer 783 positioned between the first transparent electrode 781 and the second transparent electrode 782. In this case, the first transparent electrode 781 may be formed on a first transparent substrate 784, and the second transparent electrode 782 may be formed on a second transparent substrate 785. The electrochromic layer 783 may absorb a specific wavelength range of light incident from the light source module in accordance with voltages applied to the first and second transparent electrodes 781 and 782.

The electrochromic layer 783 may be any one of a multi-layered thin film state, a solution state, a mixture state of the multi-layered thin film and the solution.

As the case may be, as shown in FIG. 15, the electrochromic layer 783 may be formed in such a manner that an electrolytic layer 783$a$ and an electrochromic material layer 783$b$ are deposited.

As another case, as shown in FIG. 16, the electrochromic layer 783 may be formed of a mixture layer of electrolyte and an electrochromic material.

As still another case, the electrochromic layer 783 may be a mixture of an electrochromic material and nano particles. In this case, the nano particles may be made of at least one or more selected from a group of a titanium oxide, a zirconium oxide, a strontium oxide, a niobium oxide, a hafnium oxide, an indium oxide, a tin oxide, and a zinc oxide. The nano particles may have a size of 5 nm to 30 nm, approximately. In this case, a specific wavelength range of light absorbed by the electrochromic layer 783 may be varied depending on a mixture ratio of the electrochromic material and nano particles, a size of nano particles, or a voltage value which is applied.

Meanwhile, as shown in FIG. 16, moisture absorption layers 786 and 787 may be positioned between the first transparent electrode 781 and the electrochromic layer 783 of the electrochromic module or between the electrochromic layer 783 and the second transparent electrode 782 of the electrochromic module. Since the electrochromic layer 783 is vulnerable to water or moisture, the moisture absorption layers 786 and 787 are positioned to block externally permeated water or moisture.

Figure 17:
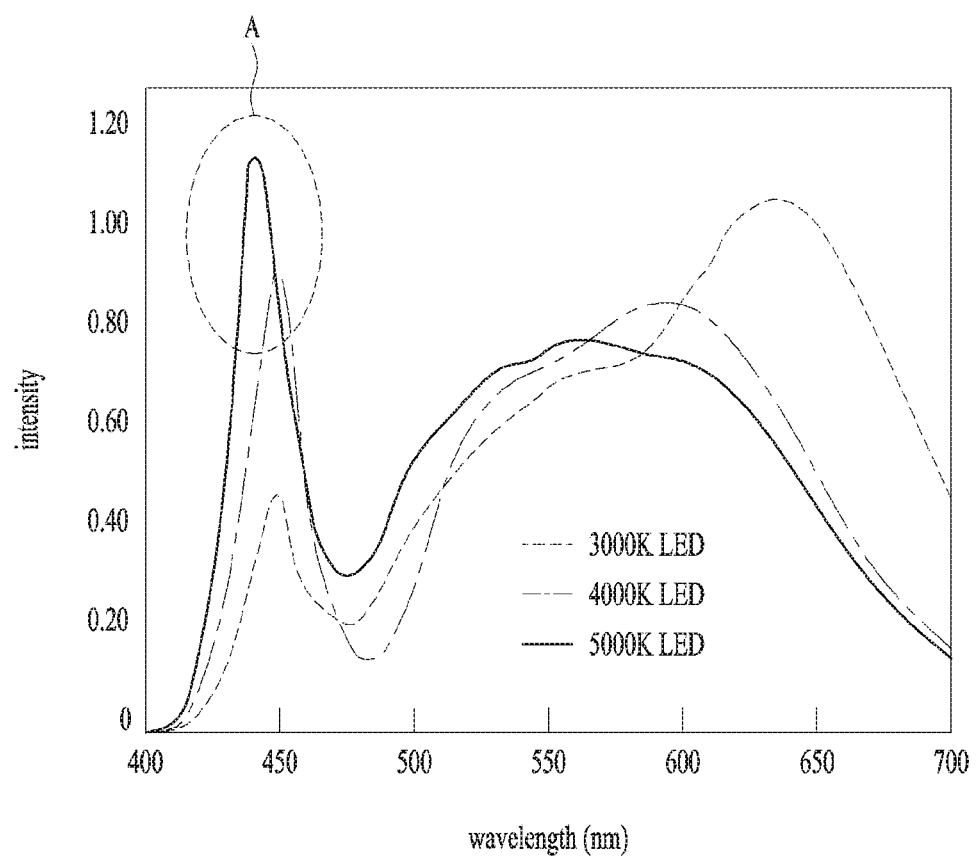
FIG. 17 is a graph illustrating a light spectrum according to a color temperature of illumination light.

FIG. 17 is a graph illustrating a light spectrum according to a color temperature of illumination light.

As shown in FIG. 17, in the lighting apparatus of the present invention, the light source module generates white light. In this case, it is noted from a light spectrum of the white light that light intensity is rapidly increased at a wavelength range of about 450 nm (area A) if a color temperature is increased.

Since light of a wavelength range of about 450 nm (area A) may be harmful to a human body, if light having great intensity of a wavelength range (area A) of about 450 nm is generated from the lighting apparatus when a user reads a book, the light may adversely affect eyes of the user.

Therefore, the controller of the lighting apparatus may analyze a light spectrum of the illumination light, and absorb light of a wavelength of about 450 nm in accordance with a previously set absorption ratio by controlling the electrochromic module if light having great intensity of a wavelength range of about 450 nm is generated.

As described above, the lighting apparatus of the present invention may absorb light of a specific wavelength in accordance with the lighting mode to provide a lighting mood convenient for a user, facilitate color temperature control, reduce light of a blue area wavelength range harmful to a human body and generate light close to natural light.

Figure 18:
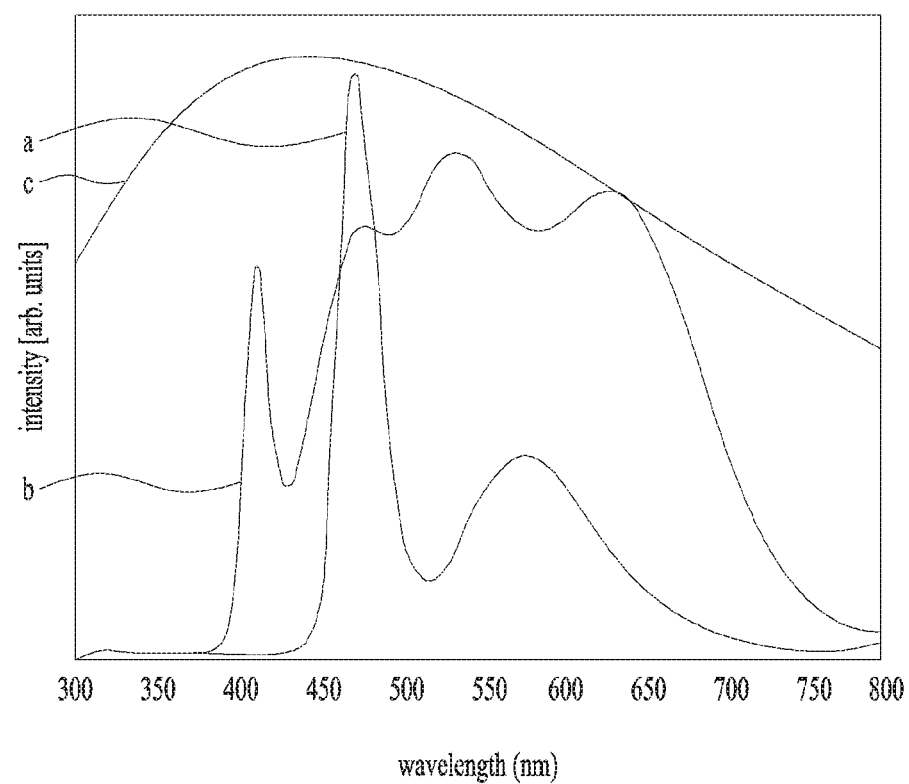
FIG. 18 is a graph illustrating a light spectrum according to illumination light.

FIG. 18 is a graph illustrating a light spectrum according to illumination light.

As shown in FIG. 18, 'a' shows a light spectrum of light generated from the light source that includes a blue LED and a yellow fluorescent body, 'b' shows a light spectrum of light generated from the light source that includes a UV LED and an RGB fluorescent body, and 'c' shows a light spectrum of natural light.

Various light spectrums of generated illumination light may be provided depending on types of the light source.

Therefore, the lighting apparatus of the present invention may analyze the light spectrum of the generated illumination light and control the electrochromic module based on the analyzed light spectrum to absorb light of a specific wavelength range, whereby illumination light may be varied to light close to natural light.

That is, the lighting apparatus of the present invention may vary the light spectrum of the illumination light such as 'a' and 'b' to the light spectrum of natural light such as 'c' by controlling the electrochromic module.

Figure 19:
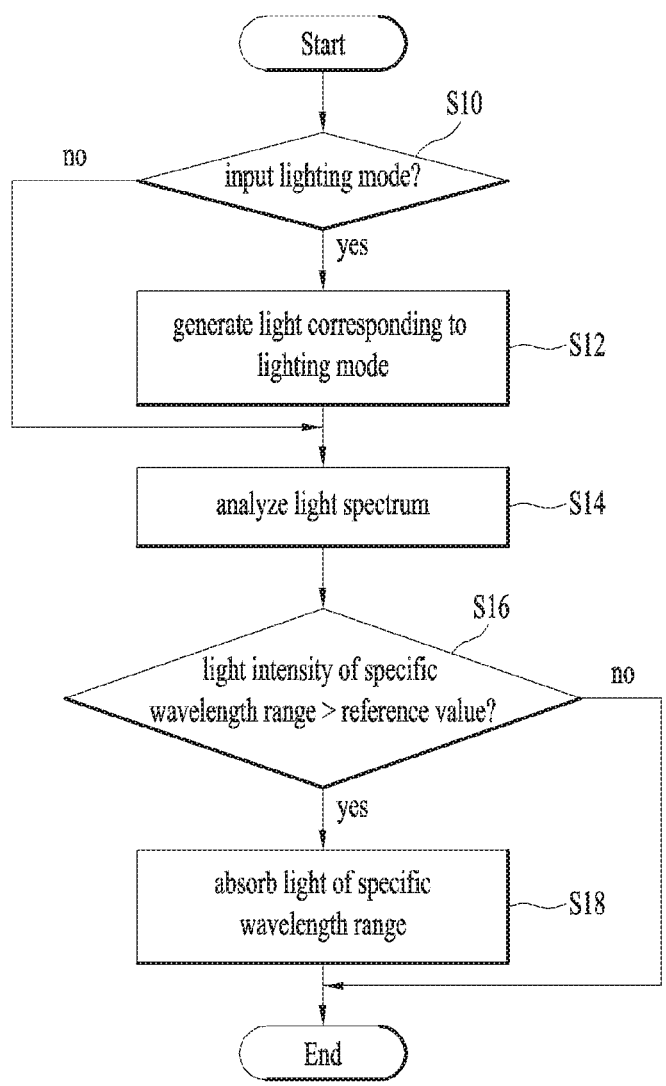
FIG. 19 is a flow chart illustrating a method for controlling lighting of a lighting apparatus according to the first embodiment of the present invention.

FIG. 19 is a flow chart illustrating a method for controlling lighting of a lighting apparatus according to the first embodiment of the present invention.

As shown in FIG. 19, the lighting apparatus of the present invention identifies whether the lighting mode is input (S10).

If the lighting mode is input, the lighting apparatus generates light corresponding to the input lighting mode (S12). In this case, the lighting apparatus may determine a light color and light luminance corresponding to the input lighting mode and generate light in accordance with the determined light color and light luminance.

Subsequently, the lighting apparatus may extract light spectrum information corresponding to the lighting mode from a memory and analyze the extracted light spectrum information (S14).

Then, the lighting apparatus identifies from the analyzed light spectrum whether light intensity of a specific wavelength range corresponding to the lighting mode is greater than a reference value (S16).

If light intensity of the specific wavelength range is greater than the reference value, the lighting apparatus may absorb light of the corresponding specific wavelength range (S18).

Meanwhile, the lighting apparatus may not generate light corresponding to the lighting mode if the lighting mode is not inputted, and may extract light spectrum information corresponding to a basic mode from the memory and analyze the extracted light spectrum information.

Also, the lighting apparatus may control the electrochromic module to adjust a light absorption ratio in accordance with the lighting mode which is inputted, when absorbing light of a specific wavelength range. In this case, if the light absorption ratio is adjusted by the electrochromic module, light intensity corresponding to the specific wavelength range may be adjusted.

As described above, according to the present invention, the light source module and the electrochromic module may be arranged to provide a lighting mood convenient for a user in accordance with the lighting mode, facilitate color temperature control, reduce light of a blue area wavelength range harmful to a human body and generate light close to natural light.

Also, according to the present invention, the light spectrum corresponding to the lighting mode may be analyzed to accurately control a color temperature of the light and a lighting color.

Figure 20:
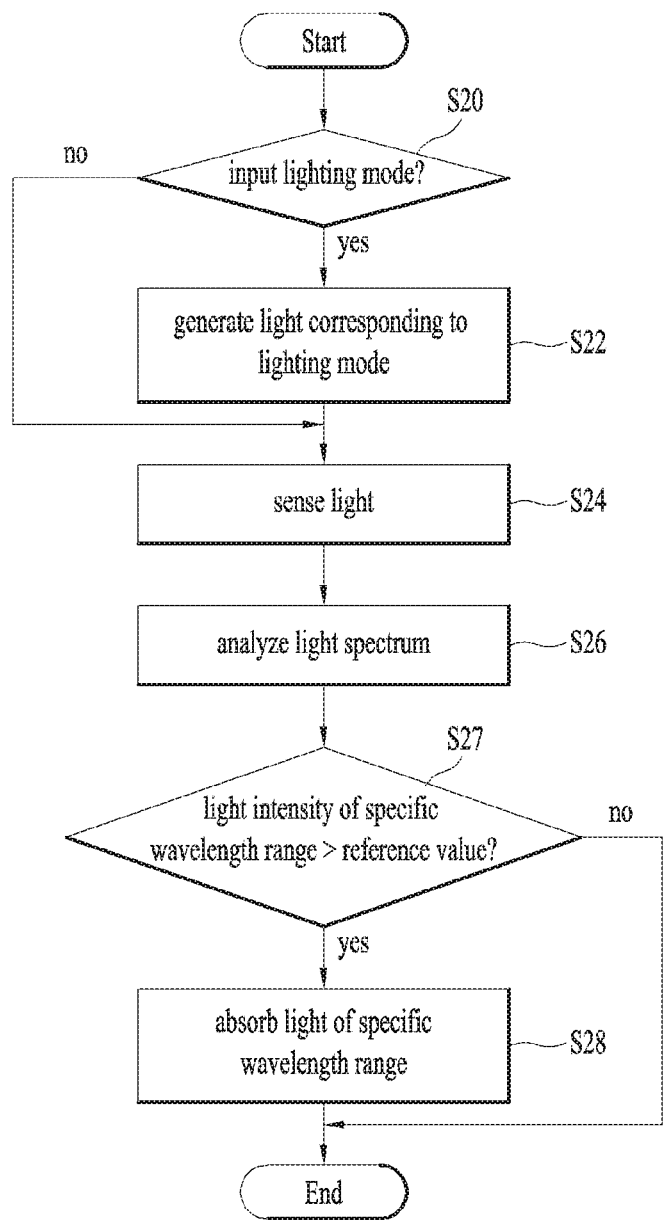
FIGS. 20 and 21 are flow charts illustrating a method for controlling lighting of a lighting apparatus according to the second embodiment of the present invention.
Figure 21:
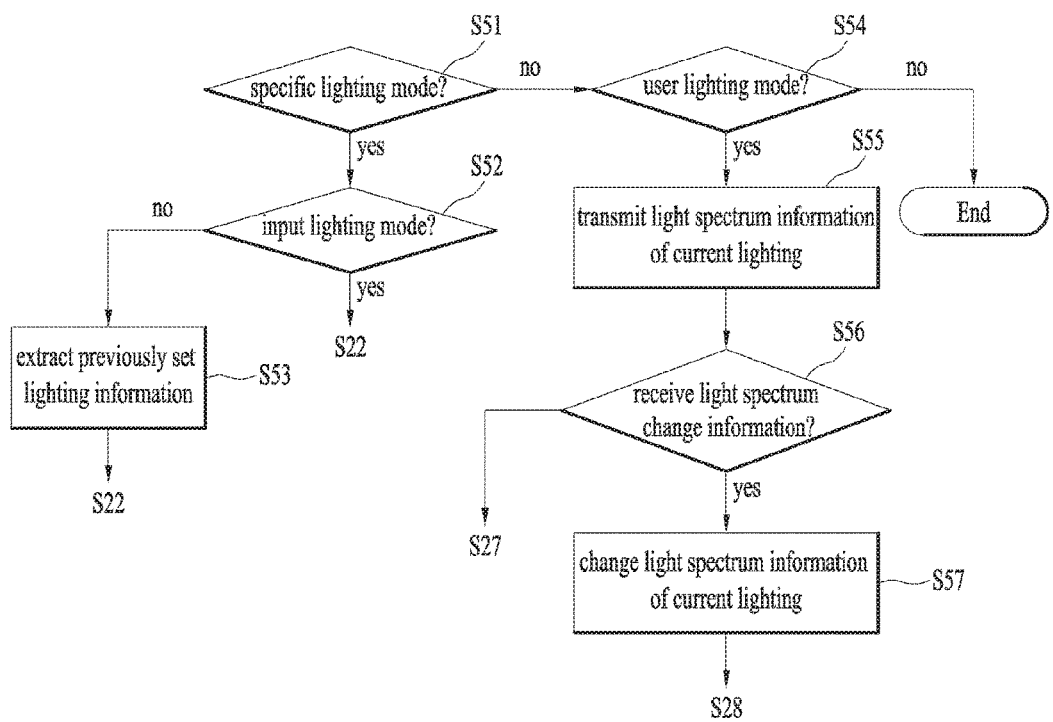

FIGS. 20 and 21 are flow charts illustrating a method for controlling lighting of a lighting apparatus according to the second embodiment of the present invention.

As shown in FIGS. 20 and 21, the lighting apparatus of the present invention identifies whether the lighting mode is input (S20).

If the lighting mode is input, the lighting apparatus generates light corresponding to the input lighting mode (S22). In this case, the lighting apparatus may determine a light color and light luminance corresponding to the input lighting mode and generate light in accordance with the determined light color and light luminance.

Subsequently, the lighting apparatus senses the generated illumination light in accordance with the lighting mode (S24).

And, the lighting apparatus may analyze a light spectrum of the sensed illumination light (S26).

Then, the lighting apparatus identifies from the analyzed light spectrum whether light intensity of a specific wavelength range corresponding to the lighting mode is greater than a reference value (S27).

If light intensity of the specific wavelength range is greater than the reference value, the lighting apparatus may absorb light of the corresponding specific wavelength range (S28).

Meanwhile, the lighting apparatus may not generate light corresponding to the lighting mode if the lighting mode is not inputted, and may sense current illumination light and analyze a light spectrum of the sensed illumination light.

Also, the lighting apparatus may control the electrochromic module to adjust a light absorption ratio in accordance with the lighting mode which is input, when absorbing light of a specific wavelength range. In this case, if the light absorption ratio is adjusted by the electrochromic module, light intensity corresponding to the specific wavelength range may be adjusted.

As another case, as shown in FIG. 21, if the lighting mode is input, the lighting apparatus identifies whether the input lighting mode requests a specific lighting mode (SM).

Subsequently, if the input lighting mode is a specific lighting mode request signal, the lighting apparatus identifies whether specific lighting information corresponding to the specific lighting mode is included in the specific lighting mode request signal (S52). In this case, the specific lighting information may include at least any one of a light color corresponding to the requested specific lighting mode, light luminance, a specific wavelength range of light desired to be absorbed, and a light absorption ratio of the specific wavelength range.

Then, if specific lighting information corresponding to the specific lighting mode is included in the specific lighting request signal, the lighting apparatus may generate illumination light corresponding to the specific lighting information (S22).

However, if the specific lighting information corresponding to the specific lighting mode is not included in the specific lighting mode request signal, the lighting apparatus may extract previously set lighting information (S53) and generate illumination light corresponding to the previously set lighting information (S22). In this case, the previously set lighting information may include at least any one of a light color corresponding to the requested specific lighting mode, light luminance, a specific wavelength range of light desired to be absorbed, and a light absorption ratio of the specific wavelength range.

Also, if the input lighting mode is not the specific lighting mode request, the lighting apparatus identifies a user lighting mode (S54).

If the input lighting mode is the user lighting mode, the lighting apparatus analyzes a light spectrum corresponding to the current illumination light and transmits the analyzed light spectrum information to a terminal of a user (S55). In this case, the light spectrum information may include light wavelength and light intensity information of a current lighting, and harmful light wavelength and light intensity information of the current lighting.

Then, the lighting apparatus identifies whether the light spectrum information is received from the user terminal (S56).

Subsequently, if the light spectrum information is received from the user terminal, the lighting apparatus may change the light spectrum of the current lighting in accordance with the received light spectrum change information (S57) and absorb a specific wavelength range of the illumination light in accordance with the changed light spectrum (S28).

However, if the light spectrum information is not received from the user terminal, the lighting apparatus identifies from the analyzed light spectrum whether light intensity of the specific wavelength corresponding to the lighting mode is greater than the reference value (S27).

As described above, according to the present invention, the current illumination light may be sensed in real time to analyze the light spectrum corresponding to the sensed illumination light in real time, whereby a color temperature of light and a lighting color may accurately be controlled based on light spectrum information of high reliability.

Also, according to the present invention, since lighting may be controlled using the lighting information received from the user terminal, the lighting apparatus of low cost may be manufactured, and user convenience may be provided.

Also, according to the present invention, the light spectrum information of the current illumination light may be provided to the user terminal and lighting may be controlled in accordance with the changed light spectrum information, whereby various lighting moods may be provided depending on sensibility of the user.

Figure 22:
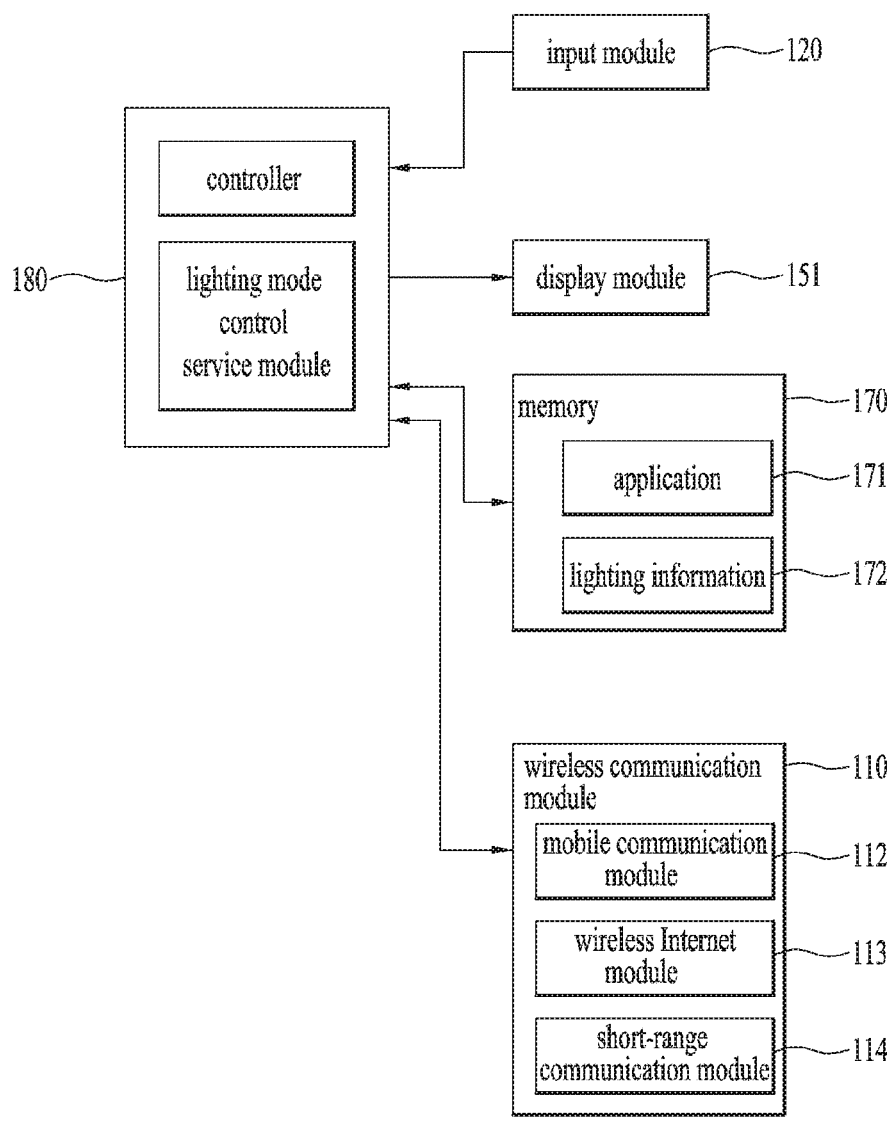
FIG. 22 is a block diagram illustrating a mobile terminal for controlling a lighting apparatus according to the present invention.

FIG. 22 is a block diagram illustrating a mobile terminal for controlling a lighting apparatus according to the present invention.

Referring to FIG. 22, the mobile terminal 100 according to one embodiment of the present invention includes a controller 180, a display module 151, an input module 120, a memory 170, and a wireless communication module 110.

The memory 170 may store an application 171 therein. Although one application 171 is shown for convenience in FIG. 22, a plurality of applications may be stored in the memory 170. The application 171 may be a native application installed during release of the mobile terminal 100 or OS/firmware upgrade, or may be an application installed by being downloaded separately by a user from an external server.

Also, the memory 170 may store lighting information 172 that includes light spectrum information according to the lighting mode.

The wireless communication module 110 may include a mobile communication module 112, a wireless Internet module 113, and a short-range communication module 114, and may transmit a lighting control signal to the lighting apparatus and receive lighting information from the lighting apparatus.

Then, the display module 151 may display a setup window for setting the lighting mode of the lighting apparatus.

The input module 120 may receive a user input.

Subsequently, the controller 180 may include a lighting control service module. Although the lighting control service module is implemented within the controller 180 as shown in FIG. 22, the lighting control service module may be implemented within a separate memory, the memory 170 or an external memory in accordance with an embodiment. The lighting control service module may be implemented from release of the mobile terminal 100, or may be implemented during O/S firmware upgrade.

For example, if the user input is a lighting mode setup of the lighting apparatus, the controller 180 may perform communication connection with the lighting apparatus. If communication connection is performed, the controller 180 may display the setup window for setting the lighting mode of the lighting apparatus connected for communication on the display module 151, and if the lighting mode of the lighting apparatus is set from the setup window, the controller 180 may transmit a lighting control signal corresponding to the set lighting mode to the lighting apparatus.

Figure 23:
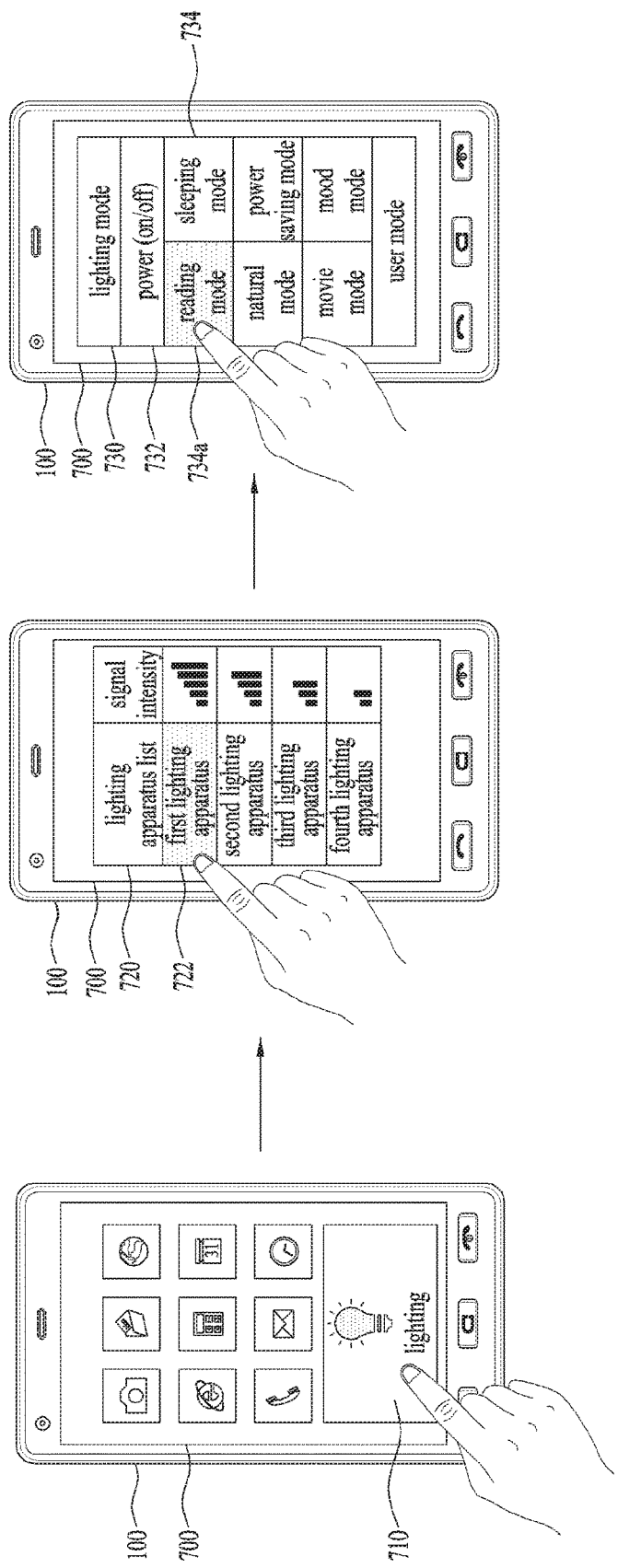
FIGS. 23 to 25 are diagrams illustrating a procedure of setting a lighting mode of a mobile terminal according to the present invention.
Figure 24:
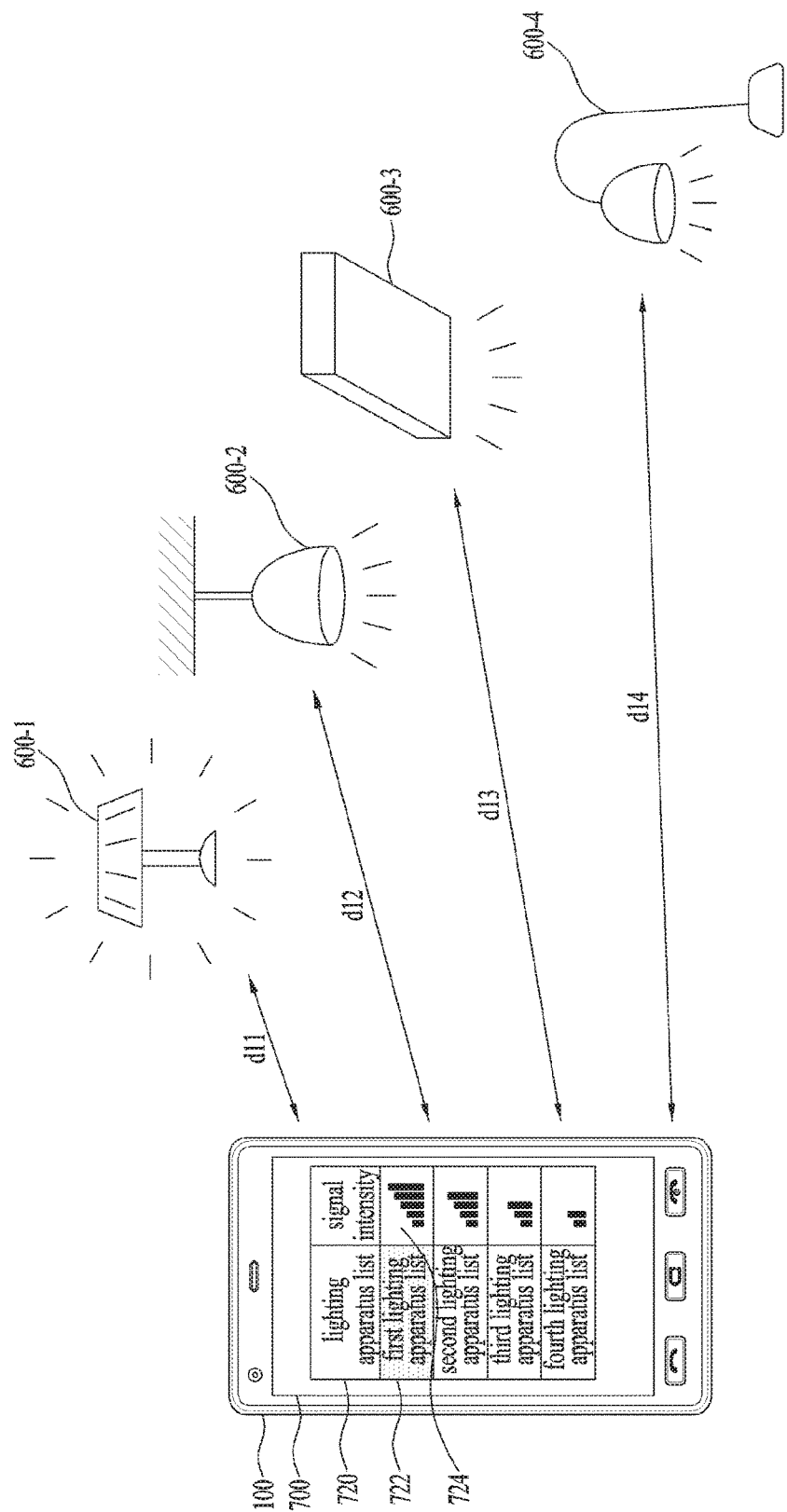
Figure 25:
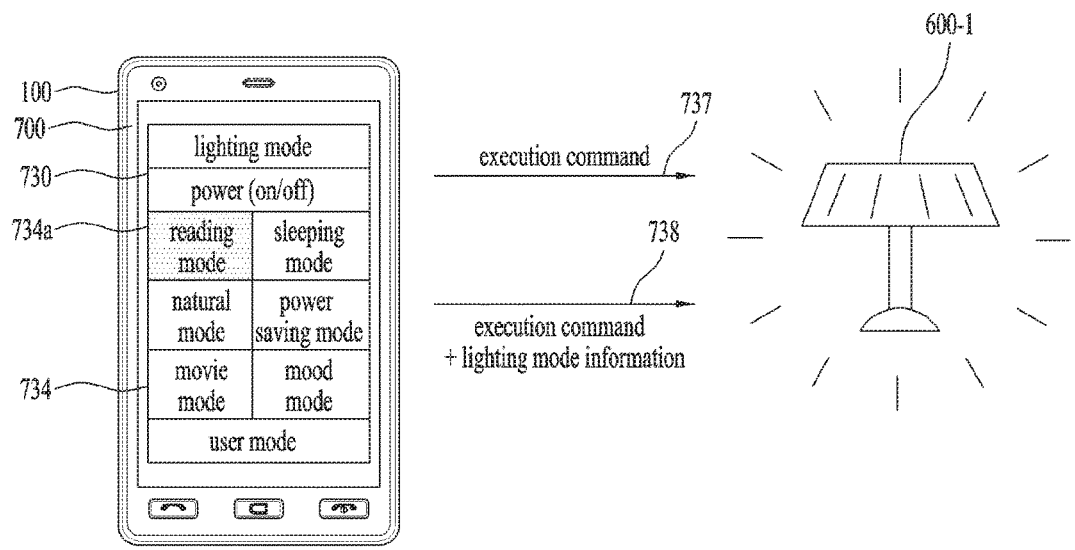

FIGS. 23 to 25 are diagrams illustrating a procedure of setting a lighting mode of a mobile terminal according to the present invention.

As shown in FIGS. 23 to 25, the mobile terminal 100 may display a lighting icon 710 for controlling the lighting apparatus on a display screen 700.

If a user input for selecting the lighting icon 710 is received, the mobile terminal 100 may recognize the user input as the lighting mode setup of the lighting apparatus and perform communication connection with the lighting apparatus.

Then, if communication connection is performed, the mobile terminal 100 may display the setup window for setting the lighting mode of the lighting apparatus connected for communication on the display screen 700. In this case, a plurality of lighting apparatuses connected for communication are provided, a lighting apparatus list 720, which includes the plurality of lighting apparatuses connected for communication, may be displayed on the display screen 700. For example, the mobile terminal 100 may list the lighting apparatuses connected for communication in the order from high signal intensity to low signal intensity when displaying the lighting apparatus list 720.

As shown in FIG. 24, when the mobile terminal 100 is spaced apart from the first lighting apparatus at a first distance d11, spaced apart from the second lighting apparatus at a second distance d12, spaced apart from the third lighting apparatus at a third distance d13 and spaced apart from the fourth lighting apparatus at a fourth distance d14, signal intensity of the mobile terminal 100 may be varied depending on the distances.

Therefore, the mobile terminal 100 may include a lighting apparatus name 722 connected for communication with the lighting apparatus list 720 and signal intensity 724 corresponding to the lighting apparatus name 722, when displaying the lighting apparatus list 720.

Subsequently, if any one lighting apparatus 722 is selected from the lighting apparatus list 720, the mobile terminal 100 may display a setup window 730 for setting a lighting mode of the selected lighting apparatus on the display screen 700. For example, the setup window 730 may include a power button 732 for turning on/off a power of lighting and a lighting mode selection button 734 that includes a reading mode, a sleeping mode, a natural mode, a power saving mode, a movie mode, a mood mode, and a user mode.

Then, if the lighting mode of the lighting apparatus is set from the setup window 730, the mobile terminal 100 may transmit a lighting control signal corresponding to the set lighting mode to the lighting apparatus. For example, if a user input for selecting a reading mode 734a is received from the lighting mode selection button 734 of the setup window 730, the mobile terminal 100 may transmit a lighting control signal corresponding to the reading mode to the first lighting apparatus.

As shown in FIG. 25, the mobile terminal 100 may transmit the lighting control signal, which includes only an execution command signal of the set lighting mode, to the corresponding lighting apparatus.

As the case may be, the mobile terminal 100 may transmit the lighting control signal, which includes the execution command signal of the set lighting mode and lighting mode information, to the lighting apparatus. In this case, the lighting mode information may include at least any one of a light color corresponding to the set lighting mode, light luminance, a specific wavelength range of light desired to be absorbed, and a light absorption ratio of the specific wavelength range.

For example, if a user input for selecting a reading mode 734a is received from the lighting mode selection button 734 of the setup window 730, the mobile terminal 100 may transmit a lighting control signal corresponding to the reading mode to the first lighting apparatus 600-1. In this case, the lighting control signal may include only the execution command signal of the set lighting mode, or may include the execution command signal of the set lighting mode and lighting mode information as the case may be. The lighting mode information may include at least any one of a light color corresponding to the set lighting mode, light luminance, a specific wavelength range of light desired to be absorbed, and a light absorption ratio of the specific wavelength range.

Figure 26:
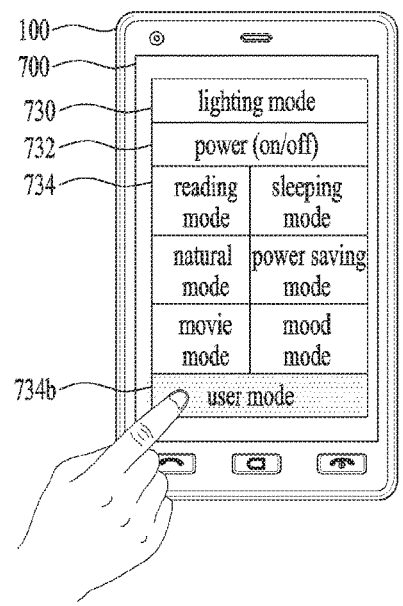
FIGS. 26 to 28 are diagrams illustrating a procedure of setting a user mode of a mobile terminal according to the present invention.
Figure 27:
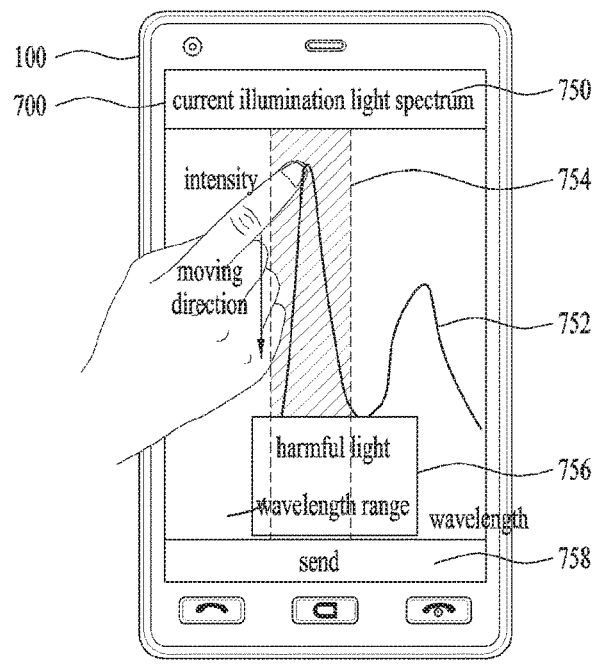
Figure 28:
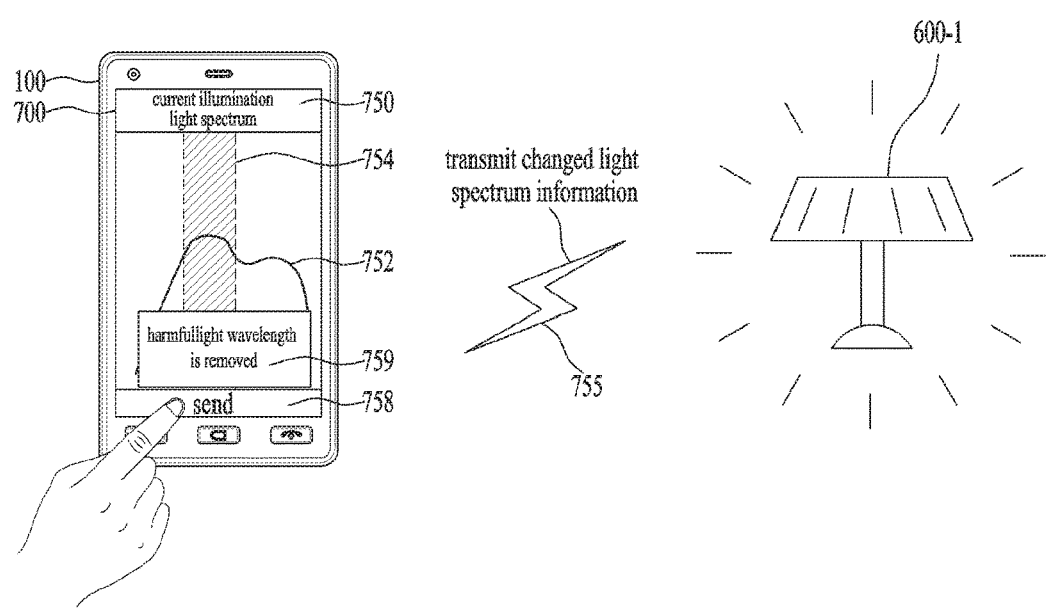

FIGS. 26 to 28 are diagrams illustrating a procedure of setting a user mode of a mobile terminal according to the present invention.

As shown in FIG. 26, if communication connection is performed, the mobile terminal 100 may display the setup window 730 for setting the lighting mode of the lighting apparatus connected for communication on the display screen 700. For example, the setup window 730 may include a power button 732 for turning on/off a power of a lighting and a lighting mode selection button 734 that includes a reading mode, a sleeping mode, a natural mode, a power saving mode, a movie mode, a mood mode, and a user mode.

Then, if a user input for selecting the user mode 734b from the lighting mode selection button 734 of the setup window 730 is received, the mobile terminal 100 may transmit the lighting control signal corresponding to the user mode to the corresponding lighting apparatus.

As shown in FIG. 27, if the set lighting mode is the user mode, the mobile terminal 100 may request the corresponding lighting apparatus of light spectrum information of current lighting, and if light spectrum information on the current lighting is received from the corresponding lighting apparatus, the mobile terminal 100 may display the light spectrum information 750 on the display screen 700. In this case, the light spectrum information 750 may include light wavelength and light intensity information of the current lighting, and harmful light wavelength and light intensity information of the current lighting.

For example, the mobile terminal 100 may display the light spectrum information 750 on the display screen 700 as a graph shape 752 indicating light intensity according to the light wavelength of the current lighting. The graph shape 752 may display a color corresponding to each wavelength range. A harmful light wavelength range 754 in the graph shape 752 may be displayed as an identification color, and a message 756 indicating a harmful light wavelength range may be displayed. In this case, if a user input for touching a certain area is received, the graph shape 752 corresponding to the touched certain area may be varied.

Subsequently, if a user touch input is received at the harmful light wavelength range 754 displayed as an identification color, the mobile terminal 100 activates the harmful light wavelength range 754 to vary the graph within the harmful light wavelength range 754.

Then, if the user touch input is a touch and drag input moving in a downward direction, the graph within the harmful light wavelength range 754 may be varied.

As shown in FIG. 28, if the graph within the harmful light wavelength range 754 is varied to signal intensity decrease by the touch input of the user, the mobile terminal 100 may change the light spectrum information to a graph shape indicates that signal intensity is decreased.

Subsequently, if a user input for varying the light spectrum information is received, the mobile terminal 100 varies the graph shape 752 and changes the light spectrum information in accordance with the varied graph shape 752. In this case, if the harmful light wavelength is decreased or removed from the changed light spectrum information, the mobile terminal 100 may display a notification message 759 indicating that the harmful light wavelength is removed.

If a user input for selecting a send button 758 is received, the mobile terminal 100 may transmit the changed light spectrum information to the corresponding lighting apparatus.

As described above, if the graph shape 752 is varied, the mobile terminal 100 may determine at least any one of a light color, light luminance, a specific wavelength range of light desired to be absorbed and a light absorption ratio of the specific wavelength range in accordance with the varied graph shape 752, and may transmit the determined information to the corresponding lighting apparatus.

Therefore, according to the present invention, since the lighting mode setup window for controlling the lighting apparatus may be displayed, user convenience may be provided.

Also, according to the present invention, since the light spectrum information received from the lighting apparatus may be displayed and the changed light spectrum information may be transmitted to the lighting apparatus, user convenience may be provided.

Figure 29:
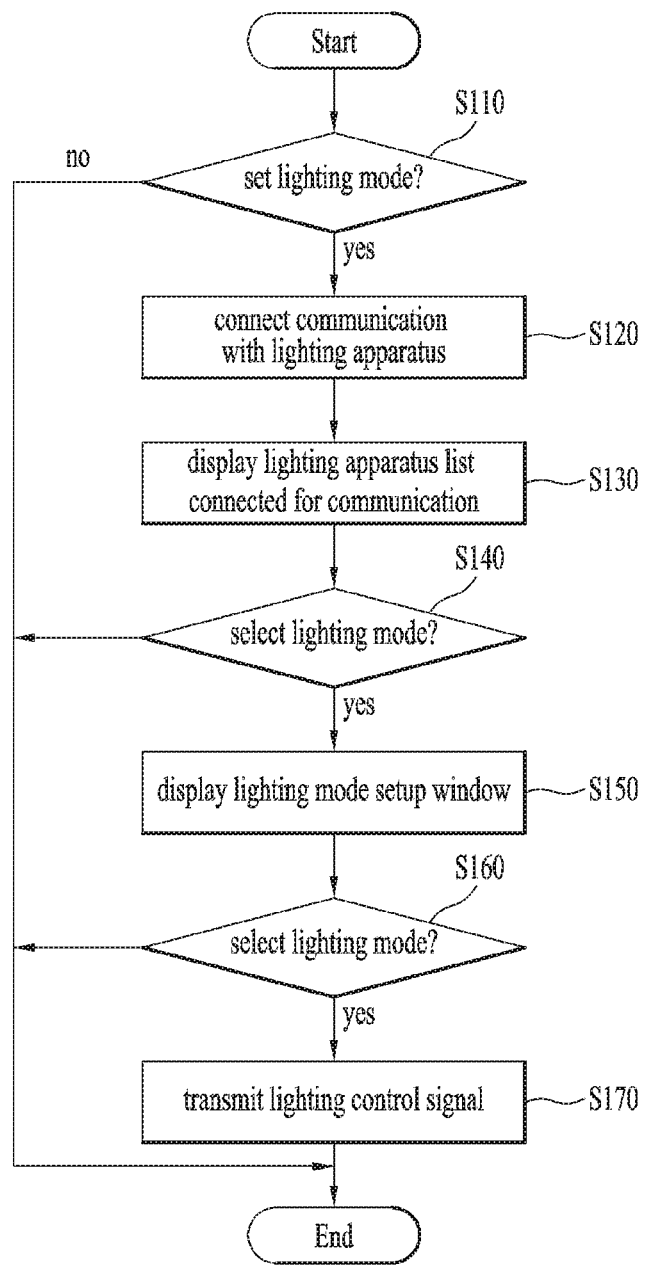
FIGS. 29 and 30 are flow charts illustrating a method for controlling a lighting apparatus of a mobile terminal according to the present invention.
Figure 30:
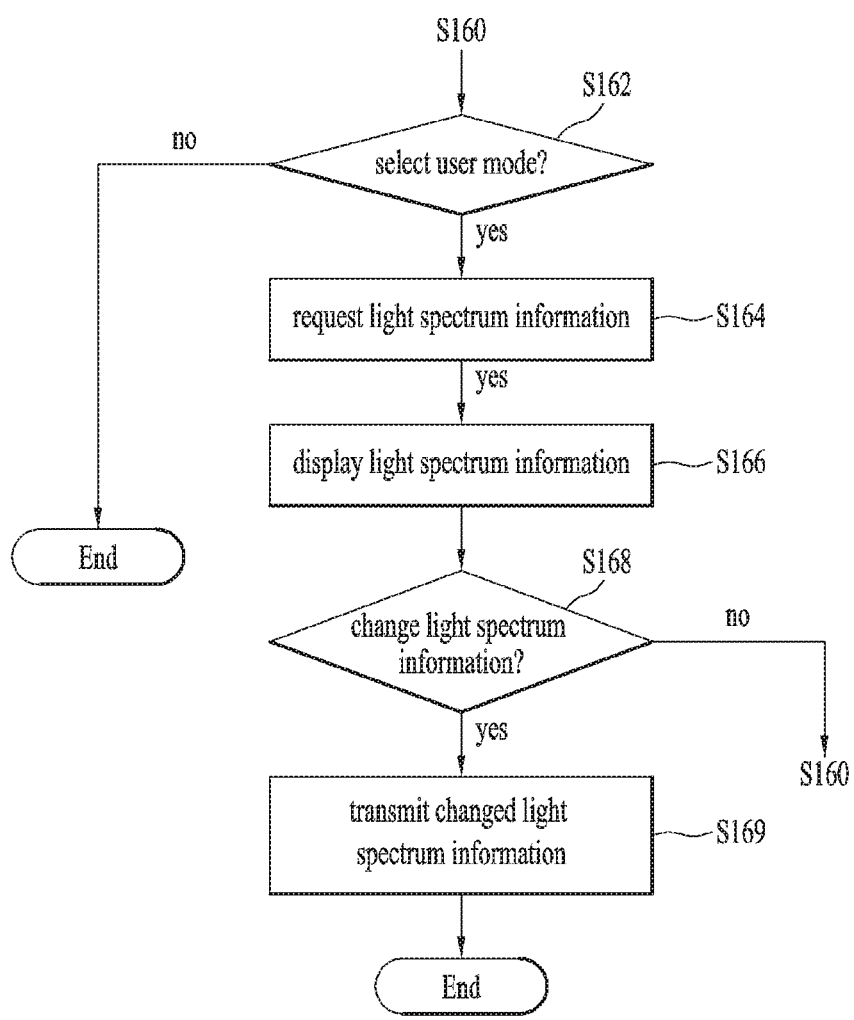

FIGS. 29 and 30 are flow charts illustrating a method for controlling a lighting apparatus of a mobile terminal according to the present invention.

As shown in FIG. 29, the mobile terminal identifies whether a user input is a lighting mode setup request of the lighting apparatus (S110).

If the user input is the lighting mode setup request of the lighting apparatus, the mobile terminal performs communication connection with the lighting apparatus (S120).

Then, the mobile terminal displays a lighting apparatus list 720, which includes the plurality of lighting apparatuses connected for communication, on the display screen (S130). In this case, the mobile terminal 100 may list the lighting apparatuses connected for communication in the order from high signal intensity to low signal intensity when displaying the lighting apparatus list.

Subsequently, the mobile terminal identifies whether any one lighting apparatus is selected from the lighting apparatus list (S140).

If any of the lighting apparatus is selected from the lighting apparatus list, the mobile terminal displays a setup window for setting a lighting mode of the selected lighting apparatus on the display screen (S150). For example, the setup window may include a power button for turning on/off a power of a lighting and a lighting mode selection button that includes a reading mode, a sleeping mode, a natural mode, a power saving mode, a movie mode, a mood mode, and a user mode.

Then, the mobile terminal identifies whether the lighting mode of the lighting apparatus is set from the setup window (S160).

Subsequently, if the lighting mode of the lighting apparatus is set from the setup window, the mobile terminal transmits a lighting control signal corresponding to the set lighting mode to the corresponding lighting apparatus (S170). In this case, the mobile terminal may transmit the lighting control signal, which includes only an execution command signal of the set lighting mode, to the corresponding lighting apparatus. As the case may be, the mobile terminal may transmit the lighting control signal, which includes the execution command signal of the set lighting mode and lighting mode information, to the lighting apparatus. In this case, the lighting mode information may include at least any one of a light color corresponding to the set lighting mode, light luminance, a specific wavelength range of light desired to be absorbed, and a light absorption ratio of the specific wavelength range.

Meanwhile, as shown in FIG. 30, if the lighting mode of the lighting apparatus is set from the setup window, the mobile terminal identifies whether the set lighting mode is a user mode (S162).

If the set lighting mode is a user mode, the mobile terminal requests the corresponding lighting apparatus of light spectrum information of current lighting (S164).

Subsequently, if light spectrum information on the current lighting is received from the corresponding lighting apparatus, the mobile terminal displays the light spectrum information on the display screen (S166). In this case, the light spectrum information received from the lighting apparatus may include light wavelength and light intensity information of the current lighting, and harmful light wavelength and light intensity information of the current lighting.

Then, the mobile terminal identifies whether the light spectrum information is changed (S168).

Subsequently, if a user input for varying the light spectrum information is received, the mobile terminal varies a graph shape and changes the light spectrum information in accordance with the varied graph shape. In this case, if the harmful light wavelength is decreased or removed from the changed light spectrum information, the mobile terminal may display a notification message indicating that the harmful light wavelength is removed.

If the light spectrum information is changed, the mobile terminal may transmit the changed light spectrum information to the corresponding lighting apparatus (S169).

As described above, if the graph shape is varied, the mobile terminal may determine at least any one of a light color, light luminance, a specific wavelength range of light desired to be absorbed and a light absorption ratio of the specific wavelength range in accordance with the varied graph shape, and may transmit the determined information to the corresponding lighting apparatus.

Therefore, according to the present invention, since the lighting mode setup window for controlling the lighting apparatus may be displayed, user convenience may be provided.

Also, according to the present invention, since the light spectrum information received from the lighting apparatus may be displayed and the changed light spectrum information may be transmitted to the lighting apparatus, user convenience may be provided.

As described above, according to the present invention, the following advantages may be obtained.

According to the present invention, the light source module and the electrochromic module may be arranged to provide a lighting mood convenient for a user in accordance with a lighting mode, facilitate color temperature control, reduce light of a blue area wavelength range harmful to a human body and generate light close to natural light.

Also, according to the present invention, the electrochromic module may be arranged in the periphery of the light guide plate to improve lighting efficiency without thickness increase.

Also, according to the present invention, the light spectrum corresponding to the current illumination light may be analyzed to accurately control a color temperature of the light and a lighting color.

Also, according to the present invention, lighting may be controlled using the lighting information received from the external terminal, whereby the lighting apparatus of low cost may be manufactured and user convenience may be provided.

Also, according to the present invention, the light spectrum information of the current illumination light may be provided to the external terminal, and lighting may be controlled in accordance with the changed light spectrum information, whereby various lighting moods may be provided in accordance with sensibility of a user.

Also, according to the present invention, since the lighting mode setup window for controlling the lighting apparatus may be displayed, user convenience may be provided.

Also, according to the present invention, since the light spectrum information received from the lighting apparatus may be displayed and the changed light spectrum information may be transmitted to the lighting apparatus, user convenience may be provided.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting apparatus comprising:
   a light source module configured to generate light;
   an electrochromic module configured to:
      vary a wavelength of light incident from the light source module; and
      absorb light of a specific wavelength range among wavelength ranges of the light incident from the light source module, in accordance with an inputted lighting mode;
   a first driving module driving the light source module;
   a second driving module driving the electrochromic module; and
   a controller configured to:
      control the first driving module to generate light corresponding to the lighting mode through the light source module when the lighting mode is inputted;
      control the second driving module to analyze a light spectrum corresponding to the generated light; and
      cause the electrochromic module to absorb the light of the specific wavelength range corresponding to the input lighting mode based on the analyzed light spectrum.

2. The lighting apparatus according to claim 1, further comprising:
   a reflective plate;
   a light guide plate positioned on the reflective plate;
   an optical member positioned on the light guide plate; and
   a cover member arranged on the optical member,
   wherein the light source module is positioned at a side of the light guide plate.

3. The lighting apparatus according to claim 2, wherein the electrochromic module is positioned between the reflective plate and the light guide plate.

4. The lighting apparatus according to claim 2, wherein the electrochromic module is positioned between the light guide plate and the optical member.

5. The lighting apparatus according to claim 2, wherein the electrochromic module is positioned between the light source module and the side of the light guide plate.

6. The lighting apparatus according to claim 1, wherein the controller is further configured to:
   control the first driving module to determine a light color and light luminance corresponding to the input lighting mode when the lighting mode is inputted; and
   generate the light in accordance with the determined light color and light luminance.

7. The lighting apparatus according to claim 1, further comprising:
   a sensing module sensing the light generated from the light source module,
   wherein the controller is further configured to:
      when light corresponding to the input lighting mode is generated, control the sensing module to sense the light generated from the light source module;
      control the second driving module to analyze a light spectrum of the light sensed from the sensing module; and
      cause the electrochromic module to absorb light of the specific wavelength range corresponding to the input lighting mode based on the analyzed light spectrum.

8. The lighting apparatus according to claim 1, further comprising:
   an input module that includes a plurality of lighting mode input buttons,
   wherein the controller is further configured to:
      control the first and second driving modules to generate light in accordance with a lighting mode corresponding to any one of the lighting mode input buttons when any one of the lighting mode input buttons is selected; and
      absorb a specific wavelength range of the generated light.

9. The lighting apparatus according to claim 1, further comprising:
   a communication module receiving a lighting control signal from an external terminal,
   wherein the controller is further configured to:
      control the first and second driving modules to generate light through the light source module in accordance with a specific lighting mode, which is requested when the lighting control signal received from the external terminal requests the specific lighting mode; and
      cause the electrochromic module to absorb a specific wavelength range of the generated light.

10. The lighting apparatus according to claim 9, wherein the controller is further configured to control the first and second driving modules in accordance with specific lighting information corresponding to the requested specific lighting mode when the specific lighting information is included in the lighting control signal received from the external terminal.

11. The lighting apparatus according to claim 9, wherein the controller is further configured to control the first and second driving modules in accordance with previously set lighting information when specific lighting information corresponding to the requested specific lighting mode is not included in the lighting control signal received from the external terminal.

12. The lighting apparatus according to claim 9, wherein the controller is further configured to:
   analyze the light spectrum corresponding to the generated light when the lighting control signal received from the external terminal is a user lighting mode request; and
   transmit the analyzed light spectrum to the external terminal.

13. The lighting apparatus according to claim 12, wherein the controller is further configured to:
   control the first and second driving modules to change a light spectrum of current lighting in accordance with light spectrum change information when the light spectrum change information is received from the external terminal which has transmitted the light spectrum information;
   generate light through the light source module in accordance with the changed light spectrum; and
   cause the electrochromic module to absorb a specific wavelength range of the generated.

\* \* \* \* \*